United States Patent
Maehara

(10) Patent No.: US 11,084,337 B2
(45) Date of Patent: Aug. 10, 2021

(54) SENSOR TRANSMITTER, WHEEL POSITIONAL DETECTION APPARATUS, AND TIRE PRESSURE MONITORING SYSTEM EQUIPPED WITH THE SAME

(71) Applicant: DENSO CORPORATION, Kariya (JP)

(72) Inventor: Hiroaki Maehara, Kariya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 16/442,636

(22) Filed: Jun. 17, 2019

(65) Prior Publication Data

US 2019/0299725 A1    Oct. 3, 2019

Related U.S. Application Data

(63) Continuation of application No. PCT/JP2018/000533, filed on Jan. 11, 2018.

(30) Foreign Application Priority Data

Jan. 11, 2017   (JP) .............................. JP2017-002723

(51) Int. Cl.
*B60C 23/04*    (2006.01)
*G01L 17/00*    (2006.01)

(52) U.S. Cl.
CPC .......... *B60C 23/0488* (2013.01); *B60C 23/04* (2013.01); *B60C 23/0416* (2013.01); *G01L 17/00* (2013.01)

(58) Field of Classification Search
None
See application file for complete search history.

(56) References Cited

U.S. PATENT DOCUMENTS

| | | | |
|---|---|---|---|
| 6,446,502 B1 | 9/2002 | Normann et al. | |
| 6,633,229 B1 | 10/2003 | Normann et al. | |
| 8,141,687 B2 * | 3/2012 | Kagawa | B60C 23/0416 188/1.11 E |
| 9,823,168 B2 * | 11/2017 | Park | G01M 17/02 |
| 10,906,361 B2 * | 2/2021 | Maehara | B60C 23/0416 |
| 2006/0238323 A1 | 10/2006 | Watabe et al. | |
| 2007/0008097 A1 | 1/2007 | Mori et al. | |
| 2009/0160632 A1 | 6/2009 | Mori et al. | |
| 2012/0319831 A1 | 12/2012 | Maehara et al. | |
| 2014/0379231 A1 * | 12/2014 | Hawes | B60C 23/0416 701/51 |

FOREIGN PATENT DOCUMENTS

JP    2014083884 A    5/2014

* cited by examiner

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A sensor transmitter calculates a tilt angle for attachment of a G sensor to a corresponding one of wheels and estimates whether the sensor transmitter itself is attached to a right wheel or a left wheel based on a calculation quadratic function, a calculation linear function, a measurement quadratic function, and a measurement linear function. Then, a receiver determines whether the sensor transmitter is attached to a front wheel or a rear wheel based on the result of the estimation and an effective tire radius. In this manner, it can be determined which one of the wheels the sensor transmitter is attached to.

7 Claims, 10 Drawing Sheets

FIG. 5
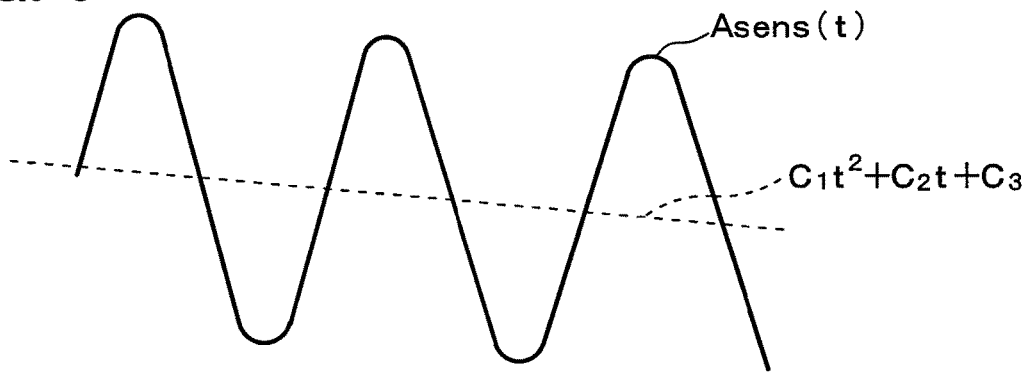
FIG. 6
| INITIAL VELOCITY ($V_0$) | 30 km/h |
|---|---|
| ACCELERATION (a) | −0.2 G |
| TIRE RADIUS | 31.1 cm |
| RIM RADIUS | 19.1 cm |
| TILT ANGLE ($\theta_{set}$) | 85° |
| VEHICLE WEIGHT | 1625 kg |
| WHEEL BASE | 2.7 m |
| HEIGHT OF GRAVITATIONAL CENTER | 55.9 cm |
| DISTANCE FROM GRAVITATIONAL CENTER TO FRONT WHEEL AXLE | 1.412 m |
| DISTANCE FROM GRAVITATIONAL CENTER TO REAR WHEEL AXLE | 1.288 m |
FIG. 7
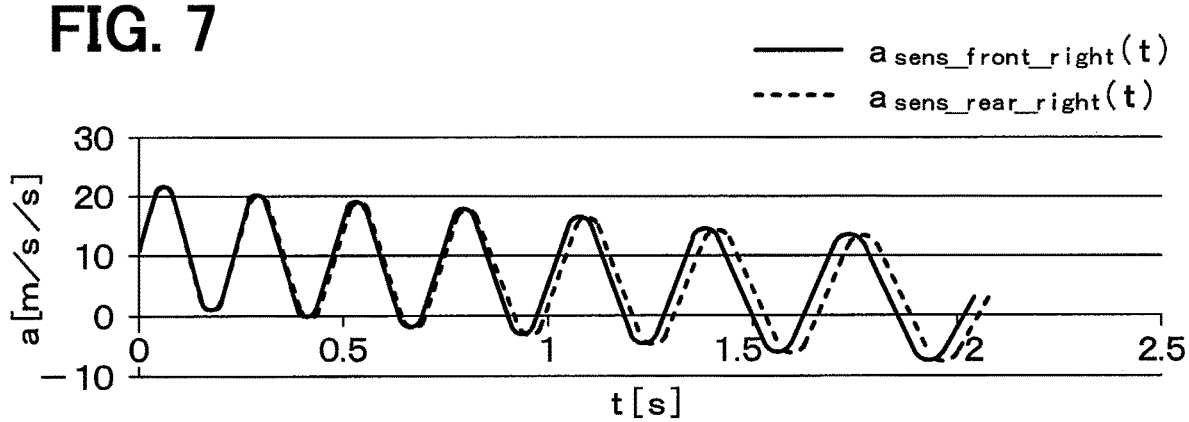

US 11,084,337 B2

SENSOR TRANSMITTER, WHEEL POSITIONAL DETECTION APPARATUS, AND TIRE PRESSURE MONITORING SYSTEM EQUIPPED WITH THE SAME

CROSS REFERENCE TO RELATED APPLICATIONS

The present application is a continuation application of International Patent Application No. PCT/JP2018/000533 filed on Jan. 11, 2018, which designated the United States and claims the benefit of priority from Japanese Patent Application No. 2017-002723 filed on Jan. 11, 2017. The entire disclosures of all of the above applications are incorporated herein by reference.

TECHNICAL FIELD

The present disclosure relates to a sensor transmitter and a wheel positional detection apparatus.

BACKGROUND

A tire pressure detection apparatus, which may be a tire pressure monitoring system (TPMS), include a direct type. The direct type of TPMS includes a sensor transmitter equipped with a sensor such as a pressure sensor. The sensor transmitter is directly attached on each wheel that is joined with a tire. This type of system also includes an antenna and a receiver on a vehicle body. A detection signal from the sensor is transmitted by the sensor transmitter and received by the receiver via the antenna to detect the tire air pressure.

SUMMARY

The present disclosure describes a sensor transmitter and a wheel positional detection apparatus for detecting a position in a vehicle where a wheel is attached to and is particularly suitable for use in a tire pressure monitoring system for detecting tire air pressure.

BRIEF DESCRIPTION OF DRAWINGS

FIG. 5 is a diagram for describing a relationship between a median value of the amplitude of acceleration $A_{sens}(t)$ that oscillates with the rotation of the wheel and its approximation in a quadratic function.

FIG. 6 is a table of conditions of the vehicle.

FIG. 7 is a graph of a waveform of a measurement value $a_{sens}$ of each of the G sensors in the sensor transmitters attached to the front right wheel and the rear right wheel.

FIG. 11A is a graph for describing a straight line indicating the measurement linear function of the front right wheel and median values of the acceleration a.

FIG. 11B is a graph for describing a straight line indicating the measurement linear function of the front left wheel and median values of the acceleration a.

FIG. 11C is a graph for describing a straight line indicating the measurement linear function of the rear right wheel and median values of the acceleration a.

FIG. 11D is a graph for describing a straight line indicating the measurement linear function of the rear left wheel and median values of the acceleration a.

DETAILED DESCRIPTION

Figure 1:
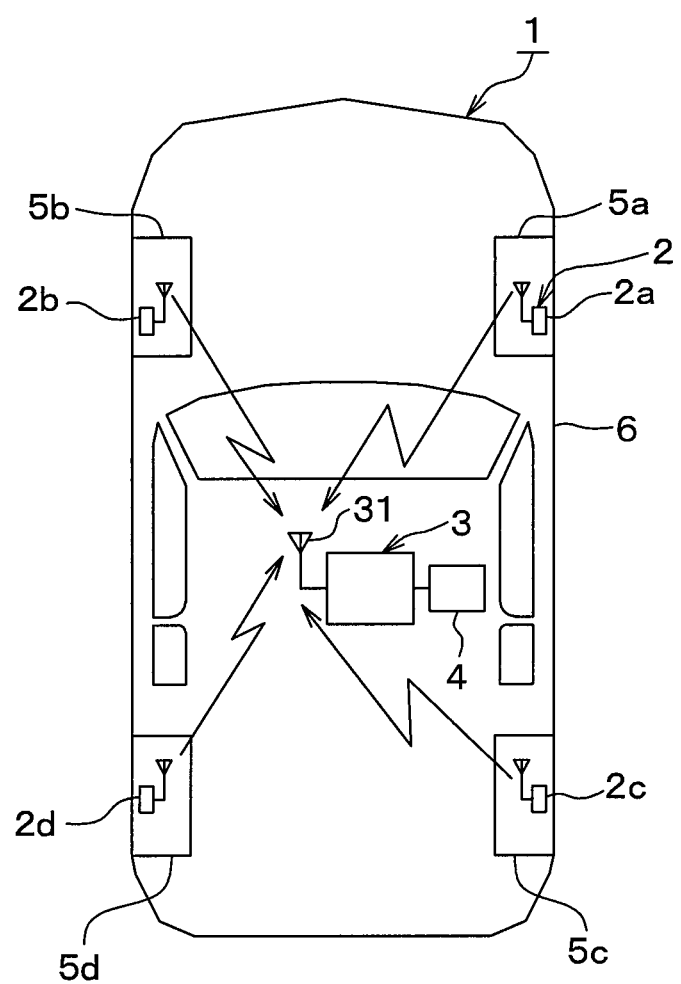
FIG. 1 is a diagram of an overall configuration of a tire pressure monitoring system according to a first embodiment, the tire pressure monitoring system using a wheel positional detection apparatus in the first embodiment.

Direct types of TPMS require the capability of determining which wheel the sensor transmitter that has transmitted the data is attached to. Various methods are thus employed as described, for example, in (1) to (6) listed below to perform wheel positional detection for detecting a wheel to which the sensor transmitter of interest is attached.

(1) In one method, the wheel positional detection is performed by using bidirectional communication where sensor transmitters, which have the function of receiving trigger signals and transmitting data indicative of the respective reception strengths of the trigger signals to the receiver. Specifically, a trigger is placed in a location at different distances from the sensor transmitters, so that the sensor transmitters measure trigger signals output by the trigger with different reception strengths. The wheel positional detection is performed based on the differences in reception strength.

(2) In another method, the receiver is placed at a location on a vehicle body at different distances from the sensor transmitters. The receiver measures the signal strength of RF (radio frequency) signals transmitted by the sensor transmitters. The wheel positional detection can be performed based on the results of the measurement and the relationship between the distances from the sensor transmitters to the receiver and reception strength patterns measured in advance.

(3) In another method, the sensor transmitters are equipped with two-axis acceleration sensors (hereinafter referred to as G sensors) that can sense the acceleration of the wheels in the rotational and radial directions. The wheel positional detection is performed based on the phase difference of detection signals from each axis of the G sensor that changes depending on the rotational direction of the associated wheel. The receiver compares the phase differences to determine whether a transmitter of interest is attached to a right wheel or left wheel.

(4) In a different method, the wheel positional detection is performed by determining whether a sensor transmitter of interest is attached on a front wheel or a rear wheel based on the fact that the traveling distance of a steerable wheel is longer than that of a driven wheel. The centrifugal force of a rotating tire is proportional to the wheel speed. A value proportional to the traveling distance of the tire is generated by integrating the centrifugal force of the wheel sensed by the corresponding G sensor. The receiver receives the generated value and determines that the wheel is a steerable wheel if the value indicates a longer tire traveling distance and that it is a driven wheel if the value indicates a shorter distance.

(5) There is another method where the wheel positional detection is performed by using gear information from a wheel speed sensor for use in the anti-lock braking system (hereinafter referred to as ABS) control. Specifically, when it is determined that a wheel achieves a predefined rotational position (rotary angle) based on an acceleration sensing signal from a G sensor attached in a sensor transmitter, a frame is transmitted from the wheel side. The passage of a tooth of the gear, which is rotated in conjunction with the wheel, is detected by the wheel speed sensor. The wheel positional detection is performed based on the variation width of the tooth position by using the fact that the position of the tooth is substantially constant for each wheel at the timing of receiving a frame.

(6) There is also a method where the receiver receives information on a tire air pressure from a sensor transmitter to measure a change in tire air pressure, when vehicle acceleration is also measured. The wheel positional detection is performed based on the fact that the value of the change in tire pressure corresponds to the vehicle acceleration.

The method described in (1), however, requires the trigger and other additional devices, thus leading to an increase in complexity of the device configuration and an increase in cost. The method described in (2) imposes a constraint on the mounting position of the receiver or the receiving antenna. With consideration given also to the vehicle conformance, their mounting positions are further limited. The method described in (3) requires a special sensor, namely, the two-axis G sensor. The method in (4) has difficulty in discriminating between a steerable wheel and a driven wheel if the front and rear wheels have different tire diameters, leading to a possible error in detection. The method in (5) uses information from the wheel speed sensor used in the ABS control, thus increasing complexity of the specifications for communication with the wheel positional detection apparatus or the tire pressure monitoring system. The method (6) has difficulty in achieving high accuracy with which the tire air pressure is detected and thus may not be able to perform accurate wheel positional detection.

In some of the embodiments of the present disclosure, a sensor transmitter, a wheel positional detection apparatus, and a tire pressure monitoring system provided with the same enable accurate wheel positional detection without requiring an additional device such as a trigger or a two-axis G sensor, with reduced constraints on mounting positions, and without increasing complexity of communication specifications.

A first controller of a wheel positional detection apparatus according to an aspect of the present disclosure calculates a tilt angle that corresponds to an angle detected by an acceleration sensor and shifted circumferentially with respect to a radial direction based on acceleration detected by the acceleration sensor and estimates whether a sensor transmitter including the first controller itself is attached to one of right wheels or one of left wheels based on a calculation quadratic function, a calculation linear function, a measurement quadratic function and a measurement linear function. The calculation quadratic function approximates a median value of an amplitude of a calculation value of acceleration by a quadratic function in response to that the acceleration sensor is attached to the corresponding one of the wheels to form the tilt angle. The calculation linear function approximates a median value of a differentiated value of the calculation value of the acceleration by a linear function. The measurement quadratic function approximates in a quadratic function a median value of an amplitude of a value actually detected by the acceleration sensor by a quadratic function. The measurement linear function approximates a median value of a differentiated value of the value actually detected by the acceleration sensor by a linear function.

Specifically, where a term C1 represents a coefficient of a quadratic term of the measurement quadratic function; a term C2 represents a linear term of the measurement quadratic function; and a term C3 represents a constant term of the measurement quadratic function, the first controller calculates the terms C1 and C2 based on a median value and time at which the median value is achieved at two points in the measurement linear function, and the first controller calculates the term C3 based on the calculated terms C1 and C2, a median value, and time at which the median value is achieved at one point in the measurement quadratic function. Furthermore, where a term a represents an acceleration of a vehicle body, a term $v_0$ represents an initial velocity of a vehicle velocity, a term $\theta_{set}$ represents the tilt angle, a term B represents an acceleration/deceleration indication value that indicates whether the vehicle is accelerating or decelerating, and a term D represents a direction proportional component resulting from removal of a gravitational acceleration component and a centrifugal acceleration component from a detection result of the acceleration sensor, the first controller determines whether a sign of the term a is positive or negative when a sign of the term $v_0$ is positive based on a relational expression of B that is $B=C2/2C1=v_0/a$, and the calculated terms C1 and C2, and calculates the term D based on a relational expression of D that is $D=-(C2/2C1)^2+C3/C1$, and the calculated terms C1, C2, and C3. The first controller then estimates whether the sensor transmitter itself including the first controller itself is attached to a right wheel or a left wheel based on a sign of a term $\tan \theta_{set}$ calculated from the term $\theta_{set}$ and whether the sign of the term a and a sign of the term D are identical with each other.

Some embodiments of the present disclosure are described below with reference to the drawings. In the following embodiments, identical or equivalent constituent elements are designated with identical symbols.

First Embodiment

A first embodiment of the present disclosure is described below. While a tire pressure monitoring system, illustrated in FIG. 1, that has the function of a wheel positional detection apparatus is described in the present embodiment, a configuration including the wheel positional detection apparatus alone may be used. A vertical direction of the page in FIG. 1 corresponds to a longitudinal direction of a vehicle 1; a horizontal direction of the page corresponds to a lateral direction of the vehicle 1. The tire pressure monitoring system in the present embodiment is described below with reference to FIG. 1.

As illustrated in FIG. 1, the tire pressure monitoring system is for installation in the vehicle 1 and configured using a sensor transmitter 2, a receiver 3, and an indicator 4.

As illustrated in FIG. 1, the sensor transmitter 2 is for installation on each of four wheels 5a to 5d in the vehicle 1. In the present embodiment, sensor transmitters 2a to 2d are attached to the wheels 5a to 5d, respectively. Each of the sensor transmitters 2a to 2d detects an air pressure in a tire attached to a corresponding one of the wheels 5a to 5d, stores tire air pressure information indicative of the result of the detection in a frame, and transmits the frame using RF. The receiver 3 is attached on a body 6 of the vehicle 1. The receiver 3 receives using RF the frames from the sensor transmitters 2a to 2d and performs various types of processing and calculation based on detection signals stored in the frames so as to perform wheel positional detection and tire air pressure detection. The configurations of the sensor transmitters 2a to 2d and the receiver 3 are described below with reference to FIGS. 2A and 2B.

Figure 2A:
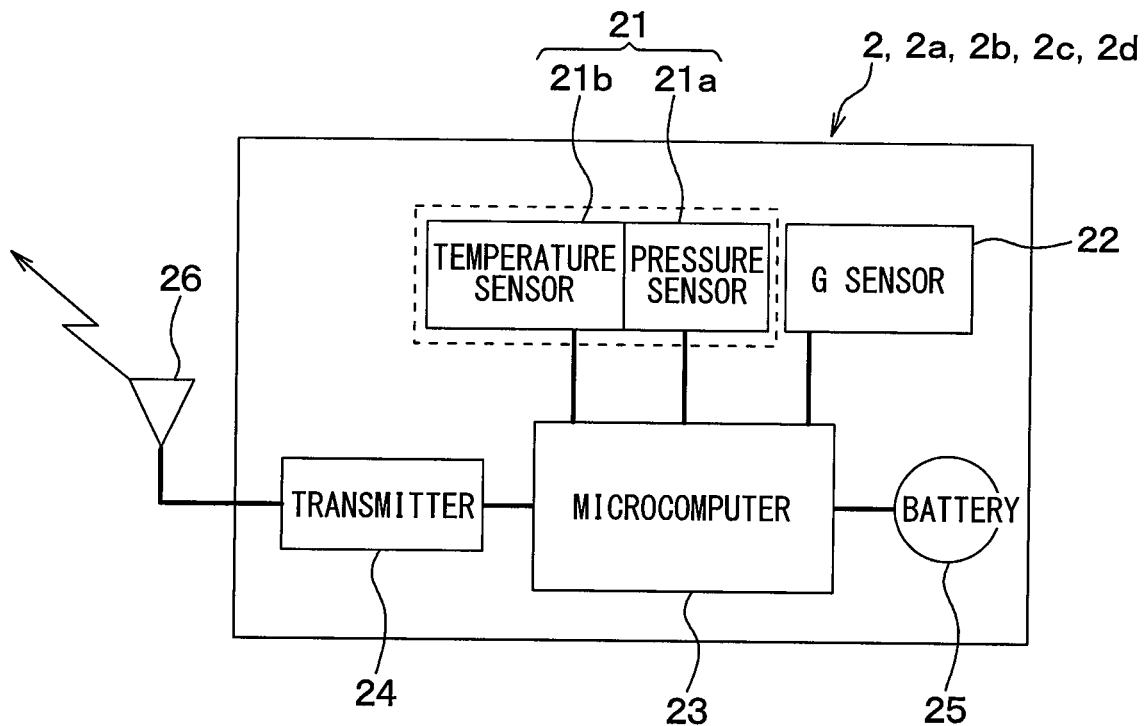
FIG. 2A is a diagram of a block configuration of a sensor transmitter.
Figure 2B:
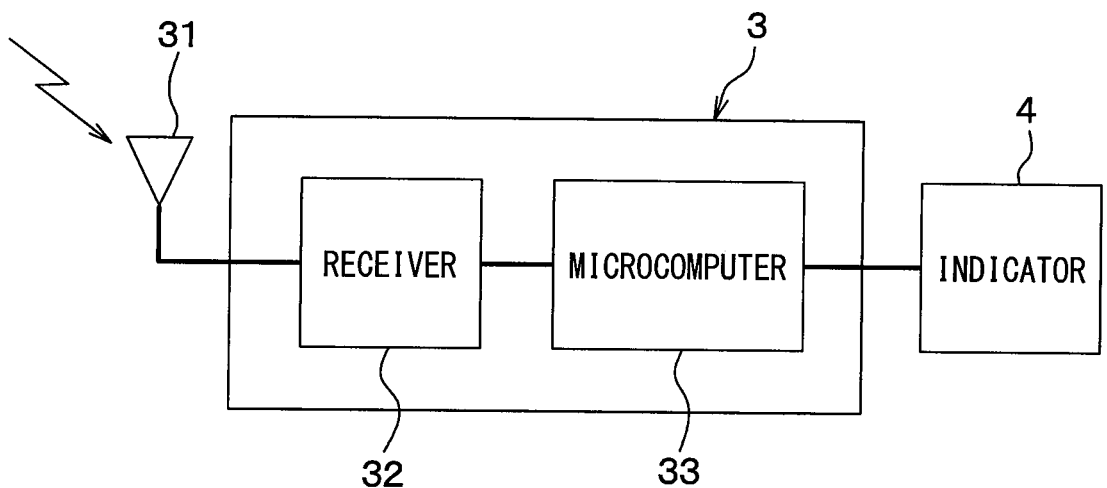
FIG. 2B is a diagram of a block configuration of a receiver.

As illustrated in FIG. 2A, the sensor transmitter 2 includes a sensor 21, a G sensor 22, a microcomputer 23, a transmitter 24, a battery 25, and a transmitting antenna 26. The constituent elements are operated on electric power from the battery 25.

The sensor 21 includes, for example, a diaphragm-type pressure sensor 21a and a temperature sensor 21b. The sensor 21 outputs a detection signal corresponding to a tire air pressure and a detection signal corresponding to temperature. The G sensor 22 detects acceleration in one direction. In the present embodiment, the mounting angle of the G sensor 22 is adjusted such that the G sensor 22 detects acceleration in a direction that is shifted circumferentially by an arbitrary angle with respect to a radial direction of a corresponding one of the wheels 5a to 5d, i.e., the normal direction with respect to the circumferential direction. This is elaborated below.

The microcomputer 23 is a widely known type of microcomputer that includes a controller, which corresponds to a first controller. The microcomputer 23 performs predefined processing including wheel positional detection processing and tire air pressure detection processing in accordance with a program stored in a memory placed in the controller. The memory in the controller stores individual ID information that includes identification information unique to the sensor transmitter for the identification of the sensor transmitters 2a to 2d and identification information unique to the vehicle for the identification of the vehicle. The memory in the controller also stores data for use in the wheel positional detection, i.e., for example, the rim diameter of the wheel to which the sensor transmitter 2 is attached. The rim diameter may be stored in the memory during the manufacturing of the sensor transmitter 2. Alternatively, the rim diameter may be written in the memory using a communication device at an automotive workshop or the like at the time of installation of the sensor transmitter 2 onto the corresponding one of the wheels 5a to 5d. If the sensor transmitter 2 and the receiver 3 are configured to allow for bidirectional communication, the rim diameter data may be stored in the memory in the controller via the receiver 3 by, for example, a user operating on the indicator 4.

The microcomputer 23 receives a detection signal relating to a tire air pressure from the sensor 21, processes and, if necessary, manipulates the signal, and stores the information on the tire air pressure in a frame together with the ID information of the corresponding one of the sensor transmitters 2a to 2d. The microcomputer 23 determines that the vehicle is traveling if, for example, acceleration detected exceeds a predefined threshold value, and then performs acceleration sampling with a short period. If the microcomputer 23 determines that the velocity of the vehicle 1 (hereinafter referred to as vehicle velocity) is a constant speed based on the detected acceleration, the microcomputer 23 calculates the mounting angle of the G sensor 22. Here, the acceleration sampling with the short period is preferably started when a certain time has elapsed after the determination that the vehicle is traveling, so that the sampling can be performed with a stabilized vehicle velocity. Having calculated the mounting angle of the G sensor 22, the microcomputer 23 estimates which wheel the sensor transmitter 2 is attached to, based on the actual acceleration detected by the G sensor 22. The estimation is preferably performed during deceleration. This is because the acceleration sampling with a short period produces a significant acceleration change during deceleration, thus enabling greater accuracy for the wheel positional detection. Here, the microcomputer 23 estimates whether the sensor transmitter 2 is attached to one of the right wheels 5a and 5c or one of the left wheels 5b and 5d. The microcomputer 23 stores data indicative of, among others, the result of the estimation whether the sensor transmitter 2 is attached to one of the right wheels 5a and 5c or one of the left wheels 5b and 5d and a value obtained during the estimation in the frame that stores the data on the tire air pressure. The estimation of the wheel position performed by the microcomputer 23 is elaborated in detail below.

Having generated the frame, the microcomputer 23 transmits the frame via the transmitter 24 from the transmitting antenna 26 to the receiver 3. The processing to transmit a frame to the receiver 3 is also performed in accordance with the program described above. For example, the frame transmission is repeated with a predefined transmission period.

The transmitter 24 serves the function of an output unit that transmits, via the transmitting antenna 26 to the receiver 3, a frame that is transmitted from the microcomputer 23. Radio waves for use in the transmission are, for example, those in an RF band.

The battery 25 supplies electric power to the microcomputer 23 and other constituent elements. By using power from the battery 25, the sensor 21 collects data on a tire air pressure, the G sensor 22 detects acceleration, and the microcomputer 23 performs various types of calculation.

The sensor transmitters 2a to 2d, which are each configured as described above, are attached to, for example, air valves of the wheels 5a to 5d, respectively, such that the sensors 21 are exposed inside the respective tires. That is, the sensor transmitters 2a to 2d are attached to the wheels 5a to 5d, respectively, in a location away from the center of rotation of the wheels by a distance that corresponds to the rim diameter, that is, specifically, by a distance that is half the rim diameter. With the configuration described above, each of the sensor transmitters 2a to 2d is enabled to detect a corresponding tire air pressure and transmit a frame at a pre-defined transmission timing via the transmitting antenna 26 provided in the corresponding one of the sensor transmitters 2a to 2d. In this manner, each of the sensor transmitters 2a to 2d transmits a signal relating to the tire air pressure to the receiver 3 regularly.

The receiver 3 includes a receiving antenna 31, a receiving unit 32, and a microcomputer 33.

The receiving antenna 31 is a shared antenna that collectively receives frames transmitted by the sensor transmitters 2. The receiving antenna 31 is fixed on the vehicle body 6.

The receiving unit 32 serves the function of an input unit that receives a frame, when the frame is transmitted by the sensor transmitter 2 and received by the receiving antenna 31, and transmits the frame to the microcomputer 33.

The microcomputer 33 corresponds to a second controller and is configured using a widely known type of microcomputer that includes a CPU, a ROM, a RAM, and an I/O. The microcomputer 33 performs predefined processing in accordance with a program stored in a memory like the ROM.

The microcomputer 33 performs wheel positional detection processing using frames transmitted from the sensor transmitters 2a to 2d in accordance with a program stored in the memory placed in the microcomputer 33. In this processing, the wheel positional detection is performed to determine which one of the wheels 5a to 5d each of the sensor transmitters 2a to 2d is attached to. That is, the microcomputer 33 reads, from a frame transmitted by each of the sensor transmitters 2a to 2d, the data indicative of, among others, the result of the estimation whether the sensor transmitter 2 is attached to one of the right wheels 5a and 5c or one of the left wheels 5b and 5d and a value obtained during the estimation. The microcomputer 33 then determines whether the sensor transmitter 2 is attached to one of the right wheels or one of the left wheels based on the data indicative of the result of the estimation and further determines whether the sensor transmitter 2 is attached to the front wheel or the rear wheel based on the data indicative of, among others, the value obtained during the estimation. The microcomputer 33 then stores the ID information of the sensor transmitters 2a to 2d in association with the positions of the wheels 5a to 5d to which the respective sensor transmitters 2a to 2d are attached, based on the result of the determination.

Subsequently, when receiving a frame transmitted by each of the sensor transmitters 2a to 2d, the microcomputer 33 performs the tire air pressure detection on the corresponding one of the wheels 5a to 5d based on the ID information and data on tire air pressure stored in the frame. Since the ID information is stored in association with the positions of the wheels 5a to 5d that the sensor transmitters 2a to 2d are attached to, the microcomputer 33 can identify the wheels 5a to 5d and perform the tire air pressure detection on each of the wheels 5a to 5d.

The indicator 4 is disposed in a place visible to a driver as illustrated in FIG. 1 and configured by using, for example, a warning lamp provided in an instrument panel in the vehicle 1. When, for example, receiving a signal indicative of a drop in tire air pressure from the microcomputer 33 of the receiver 3, the indicator 4 provides indication to notify the driver of the drop in tire air pressure.

Figure 3:
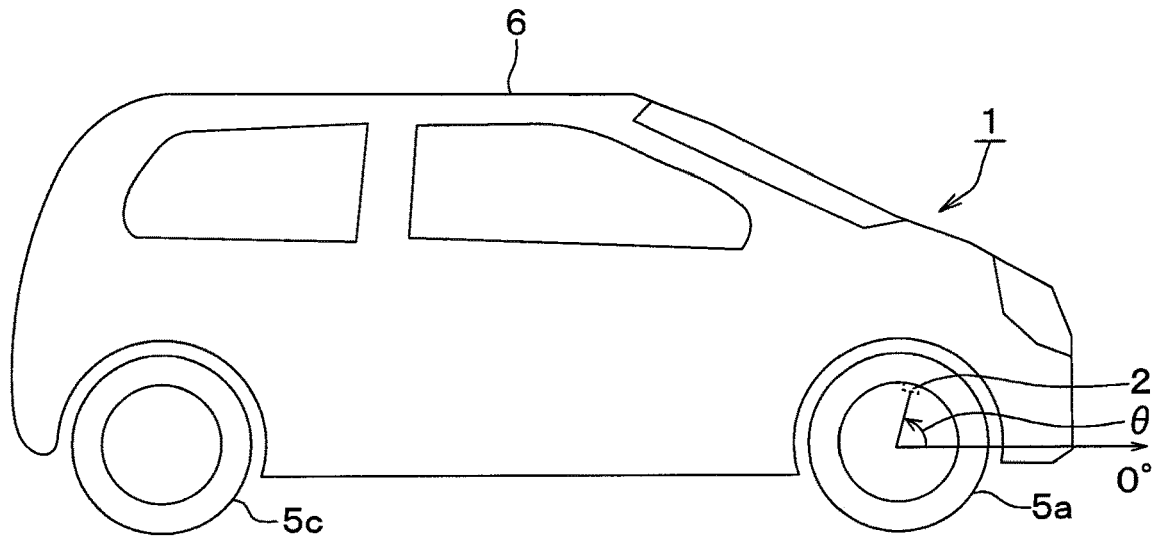
FIG. 3 is a diagram of a presence angle θ, about an axle, of the transmitter including a G sensor at a point in time as observed from a right-hand side of a vehicle.
Figure 4:
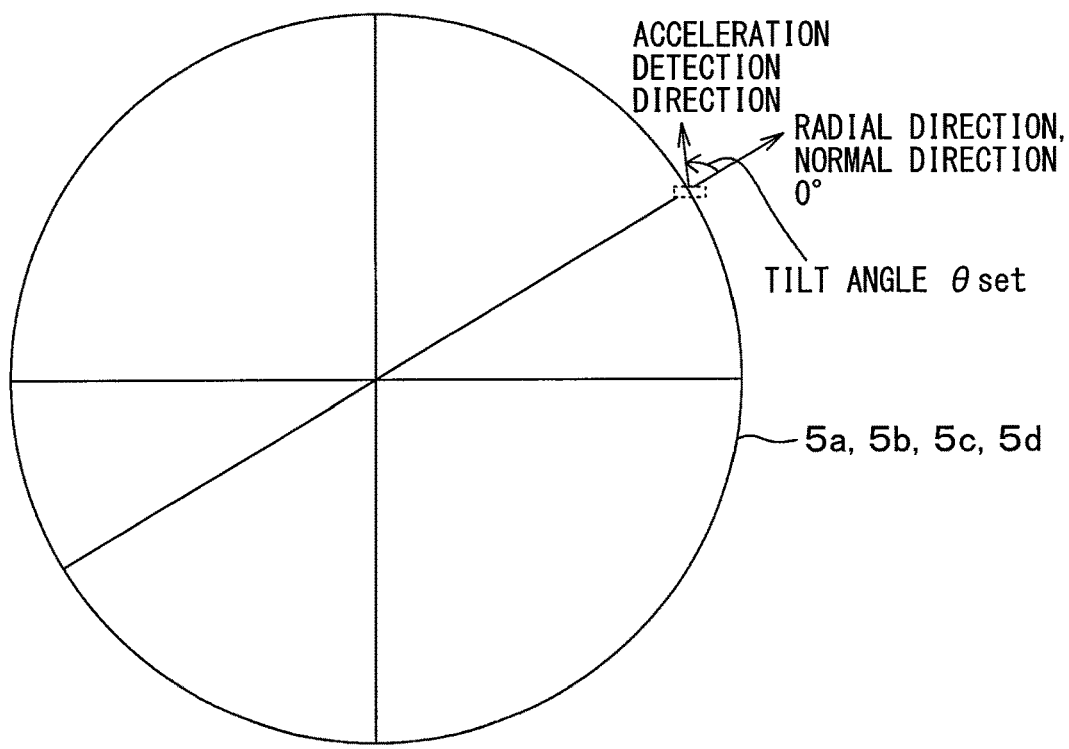
FIG. 4 is a diagram for describing a tilt angle $\theta_{set}$ for attachment of the G sensor to each wheel as observed from outside the vehicle.

Next, the wheel positional detection using the G sensor 22 included in the sensor transmitter 2 is described with reference to FIGS. 3 and 4.

The G sensor 22 included in the sensor transmitter 2 is attached to each of the wheels 5a to 5d together with the sensor transmitter 2. As illustrated in FIG. 3, a presence angle θ of the G sensor 22 is an angle about an axle. The presence angle θ is defined from the front of the vehicle 1, which is defined as 0°, and is positive when formed counterclockwise with respect to the center of each of the wheels 5a to 5d as viewed from the right side of the vehicle 1 for not only the right wheels 5a and 5c but also the left wheels 5b and 5d in the description below. As illustrated in FIG. 4, a tilt angle $\theta_{set}$ for attachment of the G sensor 22 to each of the wheels 5a to 5d is expressed as an angle that is formed by a detection direction of the G sensor 22 from the radial direction of the corresponding one of the wheels 5a to 5d, which is defined as 0°, and that is positive when formed counterclockwise as observed from outside the vehicle 1 for any of the wheels 5a to 5d.

In the present embodiment, the G sensor 22 is attached to each of the wheels 5a to 5d such that the detection direction of the G sensor 22 forms an arbitrary tilt angle $\theta_{set}$ with respect to the radial direction, instead of the detection direction being parallel with the radial direction of each of the wheels 5a to 5d. With the G sensor attached in this manner and the tilt angle $\theta_{set}$ estimated in advance, the sensor transmitter 2 estimates whether the sensor transmitter 2 itself is attached to one of the right wheels 5a and 5c or one of the left wheels 5b and 5d. The sensor transmitter 2 performs the estimation using a calculation quadratic function, a calculation linear function, a measurement quadratic function, and a measurement linear function, details of which are described below. The calculation quadratic function is a quadratic function for approximation by removal of a periodic component with respect to time from acceleration obtained by calculation. The calculation linear function is a linear function for approximation by removal of a periodic component with respect to time from an acceleration differentiated value. The measurement quadratic function is a quadratic function for approximation of a median value of an acceleration measurement value. The measurement linear function is a linear function for approximation of a median value of the acceleration differentiated value. The estimation of whether the sensor transmitter 2 is attached to one of the right wheels 5a and 5c or one of the left wheels 5b and 5d is performed based on the calculation quadratic function, the calculation linear function, the measurement quadratic function, and the measurement linear function.

The calculation quadratic function is a quadratic function that approximates calculated acceleration deemed to be detected when the G sensor 22 is attached to form the tilt angle $\theta_{set}$, and the calculation linear function is a linear function that approximates the acceleration differentiated value. The measurement quadratic function is a quadratic function that approximates acceleration actually measured by the G sensor 22, and the calculation linear function is a linear function that approximates an acceleration differentiated value.

The sensor transmitter 2 determines whether the sensor transmitter 2 itself is attached to one of the right wheels or one of the left wheels, and the receiver 3 then determines whether each of the sensor transmitters 2 is attached to the front wheel or the rear wheel. Specifically, the receiver 3 uses a difference in tire radius, such as increase/decrease of an effective tire radius due to load movement during acceleration/deceleration of each of the wheels 5a to 5d so as to determine whether each sensor transmitter 2 is attached to one of the front wheels 5a and 5b or one of the rear wheels 5c and 5d. The wheel positional detection is performed in this manner. The wheel positional detection is described below in detail.

First, the microcomputer 23 estimates whether the corresponding sensor transmitter 2 is attached to one of the right wheels or one of the left wheels. As described above, this estimation is performed based on, among others, the presumption of the tilt angle $\theta_{set}$, the calculation of the calculation quadratic function and the calculation linear function, and the calculation of the measurement quadratic function and the measurement linear function.

The estimation of the tilt angle $\theta_{set}$ and the calculation of the calculation quadratic function and the calculation linear function are performed in methods as described below.

A vehicle velocity v(t) is expressed by an Expression 1, where an initial velocity of the vehicle velocity at the timing when it is desired to perform the wheel positional detection is $v_0$, the acceleration of the vehicle 1, in other words, the acceleration of the body 6, at that time is a, and the time is t. A traveling distance L(t) of the vehicle 1 is expressed by an Expression 2.

$$v(t) = v_0 + at \quad \text{[Expression 1]}$$

$$L(t) = v_0 t + \tfrac{1}{2} a t^2 \quad \text{[Expression 2]}$$

The presence angle $\theta$ of the G sensor 22 attached to each of the wheels 5a to 5d about the axle at this timing, i.e., the current location of the G sensor 22, satisfies Expressions 3-1 to 3-4 described below in a circular arc method. In the description below, the subscript "front" indicates a front wheel, "rear" a rear wheel, "right" a right wheel, and "left" a left wheel. The presence angle $\theta$ of the G sensor 22 about the axle provided when t=0, i.e., at the start of the wheel positional detection, is represented by $\theta_0$. The effective tire radius on each of the wheels 5a to 5d is represented by $r_w$.

[Expression 3]

$$\theta_{front\_right}(t) = \theta_{0\_front\_right} - \frac{L(t)}{r_{w\_front}} \quad (3\text{-}1)$$

$$\theta_{front\_left}(t) = \theta_{0\_front\_left} - \frac{L(t)}{r_{w\_front}} \quad (3\text{-}2)$$

$$\theta_{rear\_right}(t) = \theta_{0\_rear\_right} - \frac{L(t)}{r_{w\_rear}} \quad (3\text{-}3)$$

$$\theta_{rear\_left}(t) = \theta_{0\_rear\_left} - \frac{L(t)}{r_{w\_rear}} \quad (3\text{-}4)$$

A basic expression for a measurement value $a_{sens}$ of the G sensor 22 can be expressed using the tilt angle $\theta_{set}$ in each of the wheels 5a to 5d, where $r_r$ represents the rim diameter of a tire in each of the wheels 5a to 5d.

[Expression 4]

$$a_{sens\_front\_right}(t) = -a\cos\{\theta_{front\_right}(t) + \theta_{set\_front\_right}\} - \quad (4\text{-}1)$$
$$g\sin\{\theta_{front\_right}(t) + \theta_{set\_front\_right}\} +$$
$$\frac{a \cdot r_r}{r_{w\_front}} \sin(\theta_{set\_front\_right}) + \frac{r_r}{r_{w\_front}^2}\{v(t)\}^2 \cos(\theta_{set\_front\_right})$$

$$a_{sens\_front\_left}(t) = -a\cos\{\theta_{front\_left}(t) - \theta_{set\_front\_left}\} - \quad (4\text{-}2)$$
$$g\sin\{\theta_{front\_left}(t) - \theta_{set\_front\_left}\} -$$
$$\frac{a \cdot r_r}{r_{w\_front}} \sin(\theta_{set\_front\_left}) + \frac{r_r}{r_{w\_front}^2}\{v(t)\}^2 \cos(\theta_{set\_front\_left})$$

-continued $$a_{sens\_rear\_right}(t) = -a\cos\{\theta_{rear\_right}(t) + \theta_{set\_rear\_right}\} - \quad (4\text{-}3)$$
$$g\sin\{\theta_{rear\_right}(t) + \theta_{set\_rear\_right}\} +$$
$$\frac{a \cdot r_r}{r_{w\_rear}} \sin(\theta_{set\_rear\_right}) + \frac{r_r}{r_{w\_rear}^2}\{v(t)\}^2 \cos(\theta_{set\_rear\_right})$$

$$a_{sens\_rear\_left}(t) = -a\cos\{\theta_{rear\_left}(t) - \theta_{set\_rear\_left}\} - \quad (4\text{-}4)$$
$$g\sin\{\theta_{rear\_left}(t) - \theta_{set\_rear\_left}\} -$$
$$\frac{a \cdot r_r}{r_{w\_rear}} \sin(\theta_{set\_rear\_left}) + \frac{r_r}{r_{w\_rear}^2}\{v(t)\}^2 \cos(\theta_{set\_rear\_left})$$

Here, the tilt angle $\theta_{set}$ of the G sensor 22 with respect to the corresponding one of the wheels 5a to 5d is estimated based on the Expressions 4-1 to 4-4. The estimation of the tilt angle $\theta_{set}$ is performed when the acceleration of the vehicle 1 is zero, that is, a=0. The acceleration of the vehicle 1 being zero is detected based on a gravity component of the acceleration detected by the G sensor 22. The gravity component of the acceleration appears as an amplitude waveform in every wheel rotation. When there is no change in the amplitude waveform, i.e., when the time interval between relative maximum values of the amplitude waveform is constant or when the time interval between relative minimum values is constant, it is determined that the acceleration of the vehicle 1 is zero.

For example, assuming that the acceleration of the vehicle 1 at the front right wheel 5a is zero and substituting zero for the acceleration a in the Expression 4-1 derives an Expression 5.

[Expression 5]

$$a_{sens\_front\_right}(t) = -g\sin\{\theta_{front\_right}(t) + \theta_{set\_front\_right}\} +$$
$$\frac{r_r}{r_{w\_front}^2}\{v(t)\}^2 \cos(\theta_{set\_front\_right})$$

When the acceleration a=0, the vehicle velocity v(t) is constant; thus, providing v(t)=v derives an Expression 6 from the Expression 5.

[Expression 6]

$$a_{sens\_front\_right}(t) = -g\sin\{\theta_{front\_right}(t) + \theta_{set\_front\_right}\} +$$
$$\frac{r_r}{r_{w\_front}^2} v^2 \cos(\theta_{set\_front\_right})$$

From the Expression 6, an average $A_{avg}$ of a relative maximum value and relative minimum value of $a_{sens\_front\_right}(t)$ is expressed as in an Expression 7.

[Expression 7]

$$A_{avg} = \frac{r_r}{r_{w\_front}^2} v^2 \cos(\theta_{set\_front\_right})$$

Here, if the time t is $t_M$ at the time when $a_{sens\_front\_right}(t)$ indicated in the Expression 6 achieves a relative maximum and a period of rotation is $T_{front\_right}$ for a time taken until $a_{sens\_front\_right}(t)$ then achieves a relative minimum, an Expression 8 is satisfied. That is, the value obtained by advancing, by a half period $\pi$ in terms of angle, the angle $\theta_{front\_right}(t_M) + \theta_{set\_front\_right}$ that achieves a relative maximum value is the same as that of the angle $\theta_{front\_right}(t_M + T_{front\_right}/2) + \theta_{set\_front\_right}$ obtained after the elapse of a half period of a tire rotation from $t_M$. The equation in the Expression 8 is thus satisfied. It can be seen from the Expression 8 that $T_{front\_right}$ is expressed as in an Expression 9.

[Expression 8]

$$\theta_{front\_right}(t_M) + \theta_{set\_front\_right} - \pi = \theta_{front\_right}\left(t_M + \frac{T_{front\_right}}{2}\right) + \theta_{set\_front\_right}$$

[Expression 9]

$$T_{front\_right} = \frac{2\pi r_{w\_front}}{v}$$

The average $A_{avg}$ of the relative maximum value and relative minimum value of $a_{sens\_front\_right}(t)$, that is, a median value of $a_{sens\_front\_right}(t)$, can be expressed as in an Expression 10 with the centrifugal force $r_r(2\pi/T_{front\_right})$ and the tilt angle $\theta_{set\_front\_right}$ of the G sensor 22. The tilt angle $\theta_{set\_front\_right}$ can thus be derived as in an Expression 11.

[Expression 10]

$$A_{avg} = r_r\left(\frac{2\pi}{T_{front\_right}}\right)^2 \cos(\theta_{set\_front\_right})$$

[Expression 11]

$$\theta_{set\_front\_right} = \cos^{-1}\left\{\frac{A_{avg}}{r_r}\left(\frac{T_{front\_right}}{2\pi}\right)^2\right\}$$

While the front right wheel 5a has been described as an example, the tilt angles $\theta_{set\_front\_left}$, $\theta_{set\_rear\_right}$, and $\theta_{set\_rear\_left}$ can be derived in a similar manner for the other wheels 5b to 5d. That is, the tilt angle $\theta_{set}$ can be estimated by calculation for all the G sensors 22.

Furthermore, when a value obtained by removing a periodic function with respect to the time t from the acceleration $a_{sens}(t)$ in the basic expressions for the measurement value $a_{sens}$ of the G sensor 22 indicated by the Expressions 4-1 to 4-4 is expressed as acceleration $A_{sens}(t)$, Expressions 12-1 to 12-4 are provided.

[Expression 12]

$$A_{sens\_front\_right}(t) = +\frac{a \cdot r_r}{r_{w\_front}} \sin(\theta_{set\_front\_right}) + \frac{r_r}{r_{w\_front}^2}\{v(t)\}^2 \cos(\theta_{set\_front\_right}) \quad (12\text{-}1)$$

$$A_{sens\_front\_left}(t) = -\frac{a \cdot r_r}{r_{w\_front}} \sin(\theta_{set\_front\_left}) + \frac{r_r}{r_{w\_front}^2}\{v(t)\}^2 \cos(\theta_{set\_front\_left}) \quad (12\text{-}2)$$

$$A_{sens\_rear\_right}(t) = +\frac{a \cdot r_r}{r_{w\_rear}} \sin(\theta_{set\_rear\_right}) + \frac{r_r}{r_{w\_rear}^2}\{v(t)\}^2 \cos(\theta_{set\_rear\_right}) \quad (12\text{-}3)$$

$$A_{sens\_rear\_left}(t) = -\frac{a \cdot r_r}{r_{w\_rear}} \sin(\theta_{set\_rear\_left}) + \frac{r_r}{r_{w\_rear}^2}\{v(t)\}^2 \cos(\theta_{set\_rear\_left}) \quad (12\text{-}4)$$

By rearranging the Expressions 12-1 to 12-4 with respect to t with the acceleration a of the vehicle 1 being constant, Expressions 13-1 to 13-4 can be derived as quadratic functions of t.

[Expression 13]

$$A_{sens\_front\_right}(t) = \left\{\frac{r_r a^2}{r_{w\_front}^2} \cos(\theta_{set\_front\_right})\right\}t^2 + \left\{\frac{2r_r a v_0}{r_{w\_front}^2} \cos(\theta_{set\_front\_right})\right\}t + \frac{a r_r}{r_{w\_front}} \sin(\theta_{set\_front\_right}) + \frac{r_r v_0^2}{r_{w\_front}^2} \cos(\theta_{set\_front\_right}) \quad (13\text{-}1)$$

$$A_{sens\_front\_left}(t) = \left\{\frac{r_r a^2}{r_{w\_front}^2} \cos(\theta_{set\_front\_left})\right\}t^2 + \left\{\frac{2r_r a v_0}{r_{w\_front}^2} \cos(\theta_{set\_front\_left})\right\}t - \frac{a r_r}{r_{w\_front}} \sin(\theta_{set\_front\_left}) + \frac{r_r v_0^2}{r_{w\_front}^2} \cos(\theta_{set\_front\_left}) \quad (13\text{-}2)$$

$$A_{sens\_rear\_right}(t) = \left\{\frac{r_r a^2}{r_{w\_rear}^2} \cos(\theta_{set\_rear\_right})\right\}t^2 + \left\{\frac{2r_r a v_0}{r_{w\_rear}^2} \cos(\theta_{set\_rear\_right})\right\}t + \frac{a r_r}{r_{w\_rear}} \sin(\theta_{set\_rear\_right}) + \frac{r_r v_0^2}{r_{w\_rear}^2} \cos(\theta_{set\_rear\_right}) \quad (13\text{-}3)$$

$$A_{sens\_rear\_left}(t) = \left\{\frac{r_r a^2}{r_{w\_rear}^2} \cos(\theta_{set\_rear\_left})\right\}t^2 + \left\{\frac{2r_r a v_0}{r_{w\_rear}^2} \cos(\theta_{set\_rear\_left})\right\}t - \frac{a r_r}{r_{w\_rear}} \sin(\theta_{set\_rear\_left}) + \frac{r_r v_0^2}{r_{w\_rear}^2} \cos(\theta_{set\_rear\_left}) \quad (13\text{-}4)$$

In the Expressions 13-1 to 13-4, a periodic component associated with the rotation of a corresponding one of wheels 5a to 5d has been removed. Thus, as illustrated in FIG. 5, these expressions express in a quadratic function a median value of the amplitude of the acceleration $A_{sens}(t)$, which oscillates with the rotation of each of the wheels 5a to 5d. The Expressions 13-1 to 13-4 are the calculation quadratic functions that express the acceleration $A_{sens}(t)$, which is derived from the calculation based on the basic expressions.

The Expressions 4-1 to 4-4 can be converted to Expressions 14-1 to 14-4 using C1, C2, and C3 for the coefficients of the calculation quadratic functions of the acceleration $A_{sens}(t)$ indicated by the Expressions 13-1 to 13-4.

[Expression 14]

$$A_{sens\_front\_right}(t) = C_{1\_front\_right} t^2 + C_{2\_front\_right} t + C_{3\_front\_right} \quad (14\text{-}1)$$

$$A_{sens\_front\_left}(t) = C_{1\_front\_left} t^2 + C_{2\_front\_left} t + C_{3\_front\_left} \quad (14\text{-}2)$$

$$A_{sens\_rear\_right}(t) = C_{1\_rear\_right} t^2 + C_{2\_rear\_right} t + C_{3\_rear\_right} \quad (14\text{-}3)$$

$$A_{sens\_rear\_left}(t) = C_{1\_rear\_left} t^2 + C_{2\_rear\_left} t + C_{3\_rear\_left} \quad (14\text{-}4)$$

The coefficients C1, C2 and C3 correspond to respective coefficients of the calculation quadratic functions. Specifically, the coefficient of $t^2$, a quadratic term, corresponds to C1, the coefficient of $t^1$, a linear term, corresponds to C2, and the coefficient of $t^0$, a zero degree term, i.e., a constant term, corresponds to C3. To express the coefficients C1, C2, and C3 of the Expressions 14-1 to 14-4 in mathematical expressions, Expressions 15 to 18 are provided.

[Expression 15]

$$C_{1\_front\_right} = \frac{r_r a^2}{r_{w\_front}^2} \cos(\theta_{set\_front\_right}) \quad (15\text{-}1)$$

$$C_{2\_front\_right} = \frac{2r_r a v_0}{r_{w\_front}^2} \cos(\theta_{set\_front\_right}) \quad (15\text{-}2)$$

$$C_{3\_front\_right} = +\frac{a r_r}{r_{w\_front}} \sin(\theta_{set\_front\_right}) + \frac{r_r v_0^2}{r_{w\_front}^2} \cos(\theta_{set\_front\_right}) \quad (15\text{-}3)$$

[Expression 16]

$$C_{1\_front\_left} = \frac{r_r a^2}{r_{w\_front}^2} \cos(\theta_{set\_front\_left}) \quad (16\text{-}1)$$

$$C_{2\_front\_left} = \frac{2r_r a v_0}{r_{w\_front}^2} \cos(\theta_{set\_front\_left}) \quad (16\text{-}2)$$

$$C_{3\_front\_left} = -\frac{a_r}{r_{w\_front}} \sin(\theta_{set\_front\_left}) + \frac{r_r v_0^2}{r_{w\_front}^2} \cos(\theta_{set\_front\_left}) \quad (16\text{-}3)$$

[Expression 17]

$$C_{1\_rear\_right} = \frac{r_r a^2}{r_{w\_rear}^2} \cos(\theta_{set\_rear\_right}) \quad (17\text{-}1)$$

$$C_{2\_rear\_right} = \frac{2r_r a v_0}{r_{w\_rear}^2} \cos(\theta_{set\_rear\_right}) \quad (17\text{-}2)$$

$$C_{3\_rear\_right} = +\frac{a r_r}{r_{w\_rear}} \sin(\theta_{set\_rear\_right}) + \frac{r_r v_0^2}{r_{w\_rear}^2} \cos(\theta_{set\_rear\_right}) \quad (17\text{-}3)$$

[Expression 18]

$$C_{1\_rear\_left} = \frac{r_r a^2}{r_{w\_rear}^2} \cos(\theta_{set\_rear\_left}) \quad (18\text{-}1)$$

$$C_{2\_rear\_left} = \frac{2r_r a v_0}{r_{w\_rear}^2} \cos(\theta_{set\_rear\_left}) \quad (18\text{-}2)$$

$$C_{3\_rear\_left} = -\frac{a r_r}{r_{w\_rear}} \sin(\theta_{set\_rear\_left}) + \frac{r_r v_0^2}{r_{w\_rear}^2} \cos(\theta_{set\_rear\_left}) \quad (18\text{-}3)$$

Expressions 19-1 to 19-4 can be derived by differentiating the basic expressions of the Expressions 4-1 to 4-4 with respect to the time t.

[Expression 19]

$$\frac{d}{dt} a_{sens\_front\_right}(t) = \frac{a \cdot v(t)}{r_{w\_front}} \sin\{\theta_{front\_right}(t) + \theta_{set\_front\_right}\} - \frac{g \cdot v(t)}{r_{w\_front}} \cos\{\theta_{front\_right}(t) + \theta_{set\_front\_right}\} + \frac{2 r_r a \cdot v(t)}{r_{w\_front}^2} \cos(\theta_{set\_front\_right}) \quad (19\text{-}1)$$

$$\frac{d}{dt} a_{sens\_front\_left}(t) = \frac{a \cdot v(t)}{r_{w\_front}} \sin\{\theta_{front\_left}(t) - \theta_{set\_front\_left}\} - \frac{g \cdot v(t)}{r_{w\_front}} \cos\{\theta_{front\_left}(t) - \theta_{set\_front\_left}\} + \frac{2 r_r a \cdot v(t)}{r_{w\_front}^2} \cos(\theta_{set\_front\_left}) \quad (19\text{-}2)$$

$$\frac{d}{dt} a_{sens\_rear\_right}(t) = \frac{a \cdot v(t)}{r_{w\_rear}} \sin\{\theta_{rear\_right}(t) + \theta_{set\_rear\_right}\} - \frac{g \cdot v(t)}{r_{w\_rear}} \cos\{\theta_{rear\_right}(t) + \theta_{set\_rear\_right}\} + \frac{2 r_r a \cdot v(t)}{r_{w\_rear}^2} \cos(\theta_{set\_rear\_right}) \quad (19\text{-}3)$$

$$\frac{d}{dt} a_{sens\_rear\_left}(t) = \frac{a \cdot v(t)}{r_{w\_rear}} \sin\{\theta_{rear\_left}(t) - \theta_{set\_rear\_left}\} - \frac{g \cdot v(t)}{r_{w\_rear}} \cos\{\theta_{rear\_left}(t) - \theta_{set\_rear\_left}\} + \frac{2 r_r a \cdot v(t)}{r_{w\_rear}^2} \cos(\theta_{set\_rear\_left}) \quad (19\text{-}4)$$

The acceleration differentiated value $A_{sens}(t)'$, which is a value obtained by removing the periodic function with respect to the time t from each of the Expressions 19-1 to 19-4, is expressed by Expressions 20-1 to 20-4. The Expressions 20-1 to 20-4 can be also obtained by differentiating the Expressions 13-1 to 13-4 with respect to the time t.

[Expression 20]

$$A_{sens\_front\_right}(t)' = \frac{2 r_r a^2 \cos(\theta_{set\_front\_right})}{r_{w\_front}^2} t + \frac{2 r_r a v_0 \cos(\theta_{set\_front\_right})}{r_{w\_front}^2} \quad (20\text{-}1)$$

$$A_{sens\_front\_left}(t)' = \frac{2 r_r a^2 \cos(\theta_{set\_front\_left})}{r_{w\_front}^2} t + \frac{2 r_r a v_0 \cos(\theta_{set\_front\_left})}{r_{w\_front}^2} \quad (20\text{-}2)$$

$$A_{sens\_rear\_right}(t)' = \frac{2 r_r a^2 \cos(\theta_{set\_rear\_right})}{r_{w\_rear}^2} t + \frac{2 r_r a v_0 \cos(\theta_{set\_rear\_right})}{r_{w\_rear}^2} \quad (20\text{-}3)$$

$$A_{sens\_rear\_left}(t)' = \frac{2 r_r a^2 \cos(\theta_{set\_rear\_left})}{r_{w\_rear}^2} t + \frac{2 r_r a v_0 \cos(\theta_{set\_rear\_left})}{r_{w\_rear}^2} \quad (20\text{-}4)$$

Here, the Expressions 20-1 to 20-4 can be expressed as Expressions 21-1 to 21-4 described below by using the Expressions 15-1, 15-2, 16-1, 16-2, 17-1, 17-2, 18-1, and 18-2. The function of the acceleration differentiated value $A_{sens}(t)'$ expressed by each of the Expressions 21-1 to 21-4 is the calculation linear function for approximation to a linear function by removing the periodic function with respect to the time t from the acceleration differentiated value $a_{sens}(t)'$.

[Expression 21]

$$A_{sens\_front\_right}(t)'=2C_{1\_front\_right}t+C_{2\_front\_right} \quad (12\text{-}1)$$

$$A_{sens\_front\_left}(t)'=2C_{1\_front\_left}t+C_{2\_front\_left} \quad (12\text{-}2)$$

$$A_{sens\_rear\_right}(t)'=2C_{1\_rear\_right}t+C_{2\_rear\_right} \quad (12\text{-}3)$$

$$A_{sens\_rear\_left}(t)'=2C_{1\_rear\_left}t+C_{2\_rear\_left} \quad (12\text{-}4)$$

The calculation of the measurement quadratic function and the measurement linear function are performed in methods as described below.

Actual acceleration $A_{real}(t)$, which is an approximation to a quadratic function having C1, C2 and C3 as the coefficients as in the Expressions 14-1 to 14-4, can be obtained by removing the periodic function with respect to the time t from the function of actual acceleration $a_{real}(t)$, which is actually detected by the G sensor 22. This is the measurement quadratic function, which expresses the actual acceleration $A_{real}(t)$ derived from a measurement value. An actual acceleration differentiated value $A_{real}(t)'$ having C1 and C2 as the coefficients as in the Expressions 21-1 to 21-4 can be also obtained by removing the periodic function with respect to the time t from an actual acceleration differentiated value $a_{real}(t)'$ that results from differentiation of the actual acceleration $a_{real}(t)$ with respect the time t. This is the measurement linear function, which expresses the actual acceleration differentiated value $A_{real}(t)'$ derived from a measurement value. The measurement quadratic function and the measurement linear function are expressed in an Expression 22 and an Expression 23, respectively.

$$A_{real}(t)=C_1 t^2+C_2 t=C_3 \quad \text{[Expression 22]}$$

$$A_{real}(t)'=2C_1 t+C_2 \quad \text{[Expression 23]}$$

In the Expressions 21-1 to 21-4, which are the calculation linear functions at the respective wheels, the acceleration differentiated value $A_{sens}(t)'$, C1, and C2 have subscripts for identifying the wheels. In contrast, the actual acceleration $A_{real}(t)$, the actual acceleration differentiated value $A_{real}(t)'$, and the associated C1, C2, and C3 are expressed collectively without subscripts because it is not known which wheel the G sensor 22 that the value is obtained from is attached to. It is to be known which G sensor 22's detection signal has been used to calculate the value because the actual acceleration $A_{real}(t)$, the actual acceleration differentiated value $A_{real}(t)'$, C1, C2, and C3 are calculated using a detection signal from each G sensor 22 attached to the corresponding one of the wheels.

Whether the G sensor 22 is attached to one of the right wheels 5a and 5c or one of the left wheels 5b and 5d can be determined based on a component of a detection signal from the G sensor 22. Specifically, a detection signal from the G sensor 22 contains a gravitational acceleration component and a centrifugal acceleration component, as well as a component proportional to acceleration that is added in accordance with whether the G sensor 22 is attached to one of the right wheels or one of the left wheels, i.e., acceleration attributable to the attachment direction (hereinafter referred to as a direction proportional component). With the direction proportional component represented by D, a component resulting from removal of the gravitational acceleration component and the centrifugal acceleration component from the detection signal of the G sensor 22 is the direction proportional component D sensed by the G sensor 22. The positive/negative sign of the direction proportional component D changes in accordance with whether the G sensor 22 is attached to one of the right wheels 5a and 5c or one of the left wheels 5b and 5d. It can be thus determined whether the G sensor 22 is attached to one of the right wheels 5a and 5c or one of the left wheels 5b and 5d by checking the sign of the direction proportional component D. The calculation of the direction proportional component D is performed using the calculation quadratic function, the calculation linear function, the measurement quadratic function, and the measurement linear function, as well as the tilt angle $\theta_{set}$, which are described above. A method for calculating the direction proportional component is described below.

Since the calculation quadratic function, the calculation linear function, the measurement quadratic function, and the measurement linear function are expressed as described above, C1 and C2 are first calculated based on the measurement linear function.

Specifically, the actual acceleration differentiated value $a_{real}(t)'$, which is a differentiated value of the actual acceleration $a_{real}(t)$, is calculated. Then, the measurement linear function, which expresses the actual acceleration differentiated value $A_{real}(t)'$, is obtained by removing the periodic function with respect to the time t from the actual acceleration differentiated value $a_{real}(t)'$.

That is, the actual acceleration differentiated value $a_{real}(t)'$ of the actual acceleration $a_{real}(t)$ detected by the G sensor 22 of a corresponding wheel is calculated; then, a median value of the amplitude of the actual acceleration differentiated value $a_{real}(t)'$ is calculated from a relative maximum value and relative minimum value of the actual acceleration differentiated value $a_{real}(t)'$ for at least two points. For the two points referred to here, a mean value of a relative maximum value and a subsequent relative minimum value or a mean value of a relative minimum value and a subsequent relative maximum value, for example, can be calculated as the median values. These two points correspond to two points included in the measurement linear function. The median value from each of the two points and the time t at which the median value is achieved are thus substituted in the Expression 23 described above.

In the manner described above, C1 and C2 obtained from the actual acceleration $a_{real}$ detected by the G sensor 22 attached to the corresponding wheel and the actual acceleration differentiated value $a_{real}(t)'$ are calculated. That is, simultaneous equations including C1 and C2, the values of which are to be found, are obtained by substituting the median value and the time t at which the median value is achieved in $A_{real}(t)'$ and t, respectively, in the Expression 23. Thus, C1 and C2 can be obtained by solving the simultaneous equations. The actual acceleration differentiated value $A_{real}(t)'$, which is the measurement linear function, can be obtained with C1 and C2 determined based on the detection signal from the G sensor 22 as described above.

Subsequently, C3 is calculated by incorporating C1 and C2 into the Expression 22 and substituting the actual acceleration $A_{real}$ detected by the G sensor 22 of the corresponding wheel and the time t in the Expression 22. For example, a median value is obtained from a relative maximum value and relative minimum value of the actual acceleration $a_{real}(t)$ detected by the G sensor 22 of the corresponding wheel for one point. This one point corresponds to one point included in the measurement quadratic function. The median value from the one point and the time t at which the median value is achieved are substituted in the Expression 22 described above.

As described above, C3 obtained from the actual acceleration $a_{real}$ detected by the G sensor 22 attached to the corresponding wheel is calculated, in addition to C1 and C2. In this manner, C1 to C3 can be determined easily and accurately based on a detection signal from the G sensor 22, and the acceleration $A_{sens}(t)$, which is the calculation quadratic function used to determine C1 to C3, can be obtained.

While an example has been described in which a mean value of a relative maximum value and a subsequent relative minimum value or a mean value of a relative minimum value and a subsequent relative maximum value is used as the median value, this is not a limitation. For example, a straight line that connects adjacent relative maximum values may be obtained as a relative-maximum-value straight line; a value may be then obtained as an imaginary relative maximum value on the relative-maximum-value straight line at a time t when a relative minimum value is achieved between the adjacent relative maximum values; and a mean value of the imaginary relative maximum value and the relative minimum value can be obtained as the median value. Similarly, a straight line that connects adjacent relative minimum values may be obtained as a relative-minimum-value straight line; a value may be then obtained as an imaginary relative minimum value on the relative-minimum-value straight line at a time t when a relative maximum value is achieved between the adjacent relative minimum values; and a mean value of the imaginary relative minimum value and the relative maximum value can be obtained as the median value.

The calculation quadratic function expressed by the Expressions 14-1 to 14-4 described above is then converted as in an Expression 24. With a portion of the third expression of the Expression 24 represented by D, the Expression 24 is converted as in an Expression 25. The direction proportional component D described above corresponds to D defined in the Expression 25, and D is expressed as in an Expression 26. The Expressions 24 to 26 collectively express all the wheels 5a to 5d; the correspondence of the wheels 5a to 5d to the G sensors 22 can be provided by adding subscripts corresponding to the wheels 5a to 5d as mounting position identifiers.

[Expression 24]

$$A(t) = C_1 t^2 + C_2 t + C_3 = C_1\left\{\left(t + \frac{C_2}{2C_1}\right)^2 - \left(\frac{C_2}{2C_1}\right)^2 + \frac{C_3}{C_1}\right\}$$

[Expression 25]

$$A(t) = C_1 t^2 + C_2 t + C_3 = C_1\left\{\left(t + \frac{C_2}{2C_1}\right)^2 + D\right\}$$

[Expression 26]

$$D = -\left(\frac{C_2}{2C_1}\right)^2 + \frac{C_3}{C_1}$$

Since C1, C2, and C3 are expressed as in the Expressions 15 to 18 described above, these expressions are substituted respectively in C1, C2, and C3 in the Expression 26. Then, D is expressed as in an Expression 27, which is simplified as in an Expression 28-1. While the Expressions 27 and 28-1 are derived using the front right wheel 5a as an example here, Expressions 28-2 to 28-4 are derived in a similar manner for the front left wheel 5b, the rear right wheel 5c, and the rear left wheel 5d.

[Expression 27]

$$D_{front\_right} = -\left\{\frac{\frac{2r_r a v_0}{r_{w\_front}^2}\cos(\theta_{set\_front\_right})}{2\frac{r_r a^2}{r_{w\_front}^2}\cos(\theta_{set\_front\_right})}\right\}^2 +$$

$$+\frac{\frac{ar_r}{r_{w\_front}}\sin(\theta_{set\_front\_right}) + \frac{r_r v_0^2}{r_{w\_front}^2}\cos(\theta_{set\_front\_right})}{\frac{r_r a^2}{r_{w\_front}^2}\cos(\theta_{set\_front\_right})} = -$$

$$\left(\frac{v_0}{a}\right)^2 + \frac{r_{w\_front}}{a}\tan(\theta_{set\_front\_right}) + \frac{v_0^2}{a^2}$$

[Expression 28]

$$D_{front\_right} = +\frac{r_{w\_front}}{a}\tan(\theta_{set\_front\_right}) \qquad (28\text{-}1)$$

$$D_{front\_left} = -\frac{r_{w\_front}}{a}\tan(\theta_{set\_front\_left}) \qquad (28\text{-}2)$$

$$D_{rear\_right} = +\frac{r_{w\_rear}}{a}\tan(\theta_{set\_rear\_right}) \qquad (28\text{-}3)$$

$$D_{rear\_left} = -\frac{r_{w\_rear}}{a}\tan(\theta_{set\_rear\_left}) \qquad (28\text{-}4)$$

Furthermore, the calculation linear function expressed in the Expressions 21-1 to 21-4 described above is converted as in an Expression 29. With a portion of the third expression of the Expression 29 represented by B, the Expression 29 is converted as in an Expression 30. An acceleration/deceleration indication value that indicates whether the vehicle 1 is accelerating or decelerating corresponds to B defined in the Expression 30, and B is expressed as in an Expression 31. Since C1, C2, and C3 are expressed as in the Expressions 15 to 18 described above, these expressions are substituted respectively in C1 and C2 in the Expression 29. Then, B is expressed as in an Expression 32, which is simplified as in an Expression 33-1. While the Expressions 32 and 33-1 are derived using the front right wheel 5a as an example here, Expressions 33-2 to 33-4 can be derived in a similar manner for the front left wheel 5b, the rear right wheel 5c, and the rear left wheel 5d. A vehicle velocity V0 signifies a vehicle velocity V at the timing when the wheel positional detection is performed.

[Expression 29]

$$A(t)' = 2C_1 t + C_2 = 2C_1\left(t + \frac{C_2}{2C_1}\right)$$

[Expression 30]

$$A(t)' = 2C_1(t + B)$$

[Expression 31]

$$B = \frac{C_2}{2C_1}$$

-continued

[Expression 32]

$$B_{front\_right} = \frac{C_{2\_front\_right}}{2C_{1\_front\_right}} = \frac{\frac{2r_r a v_0}{r_{w\_front}^2}\cos(\theta_{set\_front\_right})}{2\frac{r_r a^2}{r_{w\_front}^2}\cos(\theta_{set\_front\_right})}$$

[Expression 33]

$$B_{front\_right} = \frac{v_0}{a} \quad (33\text{-}1)$$

$$B_{front\_left} = \frac{v_0}{a} \quad (33\text{-}2)$$

$$B_{rear\_right} = \frac{v_0}{a} \quad (33\text{-}3)$$

$$B_{rear\_left} = \frac{v_0}{a} \quad (33\text{-}4)$$

The acceleration/deceleration indication value B described above is elaborated below. The acceleration/deceleration indication value B indicates at what timing the vehicle velocity becomes zero. That is, as shown in the Expression 30, the acceleration/deceleration indication value B indicates that the vehicle velocity becomes zero when the time t becomes −B. It is further indicated that if −B is a positive value, the vehicle velocity becomes zero at a timing later than the current point in time, i.e., in the future and that if −B is a negative value, the vehicle velocity has become zero at a timing before the current point in time, i.e., in the past. That the vehicle velocity becomes zero in the future means that the acceleration a takes a negative value because the vehicle 1 is decelerating at the current point in time, exhibiting deceleration. That the vehicle velocity was zero in the past means that the acceleration a takes a positive value because the vehicle 1 is accelerating at the current point in time, exhibiting acceleration. According to the acceleration/deceleration indication value B, it is possible to know whether the vehicle 1 is accelerating or decelerating.

Specifically, the vehicle 1 is traveling forward in most cases at the timing when the wheel positional detection is performed, and thus the vehicle velocity V0 takes a positive value. The acceleration/deceleration indication value B is expressed as in the Expression 32 and can be found by substitution of C1 and C2. Since the vehicle velocity V0 takes a positive value in the Expressions 33-1 to 33-4 and the sign of the acceleration/deceleration indication value B can be determined to be positive or negative by finding the acceleration/deceleration indication value B through the substitution of C1 and C2. Thus, it is possible to determine the sign of the acceleration a to be positive or negative.

As described above, the tilt angle $\theta_{set}$ of the G sensor 22 with respect to a corresponding one of the wheels 5a to 5d can be estimated based on the Expressions 4-1 to 4-4. In the Expressions 28-1 to 28-4, $r_w$ represents the effective tire radius of the wheels 5a to 5d and thus takes a positive value. The sign of the acceleration a can be thus determined to be positive or negative as described above. The sign of the direction proportional component D can be thus determined by using a estimate value for the tilt angle $\theta_{set}$. It can thus be determined whether the sensor transmitter 2 including the G sensor 22 is attached to one of the right wheels 5a and 5c or one of the left wheels 5b and 5d on the basis whether the sign of the direction proportional component D is positive or negative.

As indicated in the Expression 26, the direction proportional component D can be expressed using C1 to C3. Thus, by calculating C1 to C3, the direction proportional component D can be also calculated. The direction proportional component D can be also expressed as in the Expressions 28-1 to 28-4. These expressions are collectively expressed as in an Expression 34 described below.

[Expression 34]

$$\frac{D}{\tan\theta_{set}} = \pm\frac{r_w}{a}$$

The sign of the right-hand side of the Expression 34 can be determined to be positive or negative by substituting, in the Expression 34, the direction proportional component D calculated by substitution of C1 to C3 in the Expression 26, the estimated value of the tilt angle $\theta_{set}$, and the effective tire radius $r_w$, as well as by referencing the sign of the acceleration a that has been determined. Take a case where tan $\theta_{set}$ assumes a positive value as an example. If the sign of the direction proportional component D is the same as that of the acceleration a, the sign of the right-hand side of the Expression 34 is positive, because the Expression 34 satisfies and equation. If the sign of the direction proportional component D is different from that of the acceleration a, the sign of the right-hand side of the Expression 34 is negative. The sign of the right-hand side of the Expression 34 is positive when the sensor transmitter 2 is attached to one of the right wheels 5a and 5c; the sign is negative when the sensor transmitter 2 is attached to one of the left wheels 5b and 5d. This enables determination of whether the sensor transmitter 2 is attached to one of the right wheels 5a and 5c or one of the left wheels 5b and 5d.

While an example has been described above where tan $\theta_{set}$, which is obtained based on an estimated value of the tilt angle $\theta_{set}$, takes a positive value, tan $\theta_{set}$ may take a negative value. In that case, if the sign of the direction proportional component D is the same as that of the acceleration a, it can be determined that the sensor transmitter 2 is attached to one of the left wheels 5b and 5d. If the sign of the direction proportional component D is different from that of the acceleration a, it can be determined that the sensor transmitter 2 is attached to one of the right wheels 5a and 5c.

When the estimation of whether the sensor transmitter 2 is attached to one of the right wheels or one of the left wheels has been performed in the manner described above, a frame including data such as the result of the estimation and a value obtained during the estimation is transmitted by the sensor transmitter 2 and received by the receiver 3. The receiver 3 determines whether the sensor transmitter 2 that has transmitted the frame is attached to one of the right wheels or one of the left wheels based on the result of the estimation stored in the frame. The receiver 3 further determines whether the sensor transmitter 2 is attached to the front wheel or the rear wheel based on the value obtained during the estimation and stored in the frame.

A frame includes, for example, a/rw related to the effective tire radius, which is a value obtained during the estimation. It is determined whether the sensor transmitter 2 is attached to the front wheel or the rear wheel based on the value of a/rw related to the effective tire radius.

Specifically, the G sensor 22 included in the sensor transmitter 2 attached to a front wheel produces a measurement value shifted from that of the G sensor 22 included in the sensor transmitter 2 attached to a rear wheel. Assuming that the G sensors 22 are included in the sensor transmitters 2 that are attached to the front and rear wheels 5a and 5c on the right side, their measurement values have waveforms as illustrated in FIG. 7. As illustrated in this figure, while the sensor transmitters 2 that are attached to the front and rear wheels 5a and 5c on the right side are not likely to exhibit a significant difference in amplitude since they are located on the same side of the vehicle 1, they do have a phase difference corresponding to a difference in effective tire radius. In general, a front wheel has an effective tire radius smaller than that of a rear wheel; thus, the phase of the amplitude of the G sensor 22 on the front wheel is earlier than that on the rear wheel.

If the vehicle 1 is equipped with the front wheels 5a and 5b having a tire radius different from that of the rear wheels 5c and 5d, the waveforms of their measurement values exhibit a phase difference based on the difference between the effective tire radii. Whether the sensor transmitter 2 is attached to a front wheel or a rear wheel can be determined based on the phase difference. Even though the front wheels 5a and 5b have a stationary tire radius not different from that of the rear wheels 5c and 5d, the front wheels 5a and 5b have an effective tire radius different from that of the rear wheels 5c and 5d due to the load movement during acceleration/deceleration of the vehicle 1. It can be determined whether the sensor transmitter 2 is attached to a front wheel or a rear wheel based on the difference between the effective tire radii.

The receiver 3 compares the values of a/rw related to the effective tire radius of the sensor transmitters 2 that have the data of the results of the estimation indicating that the sensor transmitters 2 themselves are attached to the right wheels 5a and 5c and determines which value is larger. The receiver 3 then determines that the sensor transmitter 2 that has transmitted the data including the smaller value is attached to the front right wheel 5a and that the sensor transmitter 2 that has transmitted the data including the larger value is attached to the rear right wheel 5c. The receiver 3 similarly compares the values of a/rw related to the effective tire radius of the sensor transmitters 2 that have the data of the results of the estimation indicating that the sensor transmitters 2 themselves are attached to the left wheels 5b and 5d and determines which value is larger. The receiver 3 then determines that the sensor transmitter 2 that has transmitted the data including the smaller value is attached to the front left wheel 5b and that the sensor transmitter 2 that has transmitted the data including the larger value is attached to the rear left wheel 5d.

Alternatively, the sensor transmitter 2 can determine by itself whether the sensor transmitter 2 itself is attached to a front wheel or a rear wheel by storing a/rw during acceleration and during deceleration and comparing their absolute values. Specifically, it can be determined that the sensor transmitter 2 is attached to a front wheel, if the absolute value of a/rw obtained while a>0, i.e., during acceleration, is smaller than the absolute value of a/rw obtained while a<0, i.e., during deceleration. It can be determined whether the vehicle is accelerating or decelerating based on information such as the sign of a/rw.

As described above, the sensor transmitter 2 calculates the tilt angle $\theta_{set}$ and estimates whether the sensor transmitter 2 itself is attached to one of the right wheels 5a and 5c or one of the left wheels 5b and 5d based on the tilt angle $\theta_{set}$, as well as the calculation quadratic function, the calculation linear function, the measurement quadratic function, and the measurement linear function. Then, the receiver 3 determines whether the sensor transmitter 2 is attached to one of the front wheels 5a and 5b or one of the rear wheels 5c and 5d based on the result of the estimation and the effective tire radius. In this manner, it can be determined which one of the wheels 5a to 5d the sensor transmitter 2 is attached to.

The wheel positional detection method as described above requires no additional device such as a trigger, thus capable of preventing an increase in complexity of the device configuration and an increase in cost. Additionally, the mounting position of the receiver 3 or the receiving antenna 31 is placed under reduced constraints. Additionally, a special sensor, namely a two-axis G sensor, is not required. Furthermore, a steerable wheel and a driven wheel can be discriminated. Moreover, since information from a wheel speed sensor for use in the ABS control is not used, no increase is caused in complexity of the communication specifications. Also, accurate wheel positional detection can be performed without requiring accuracy with which the tire air pressure is detected.

For reference, how the wheel positional detection is performed is described using a specific example where detection signals from the G sensors 22 of the sensor transmitters 2 attached to the wheels 5a to 5d are analyzed in the vehicle 1 in example conditions described in FIG. 6.

Figure 8A:
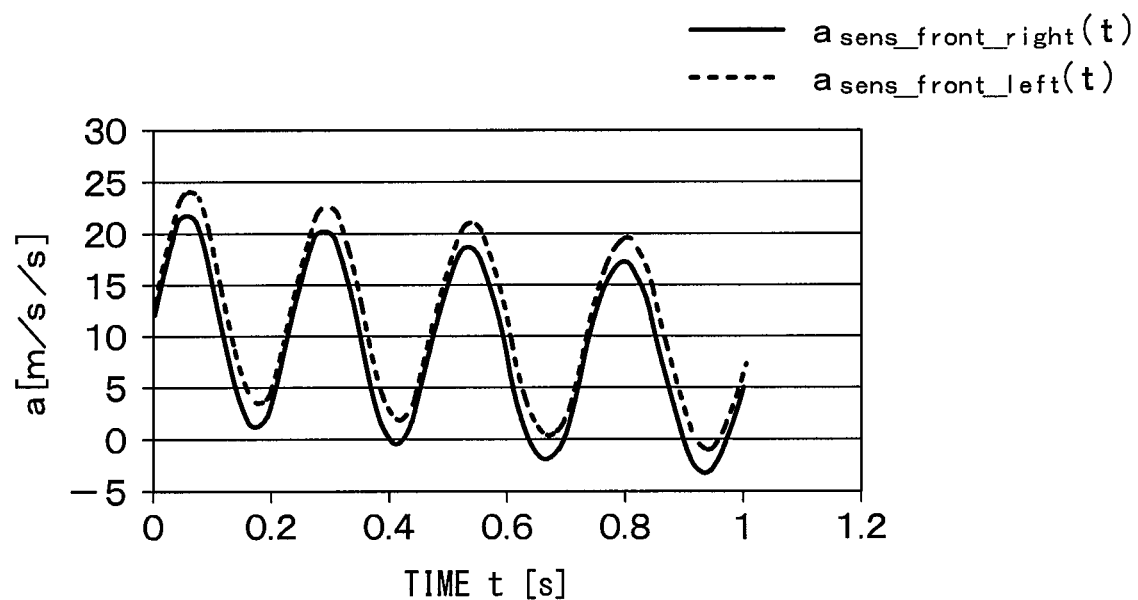
FIG. 8A is a graph of waveforms obtained when acceleration a is measured based on detection signals from the G sensors in the sensor transmitters attached to the front right and left wheels.
Figure 8B:
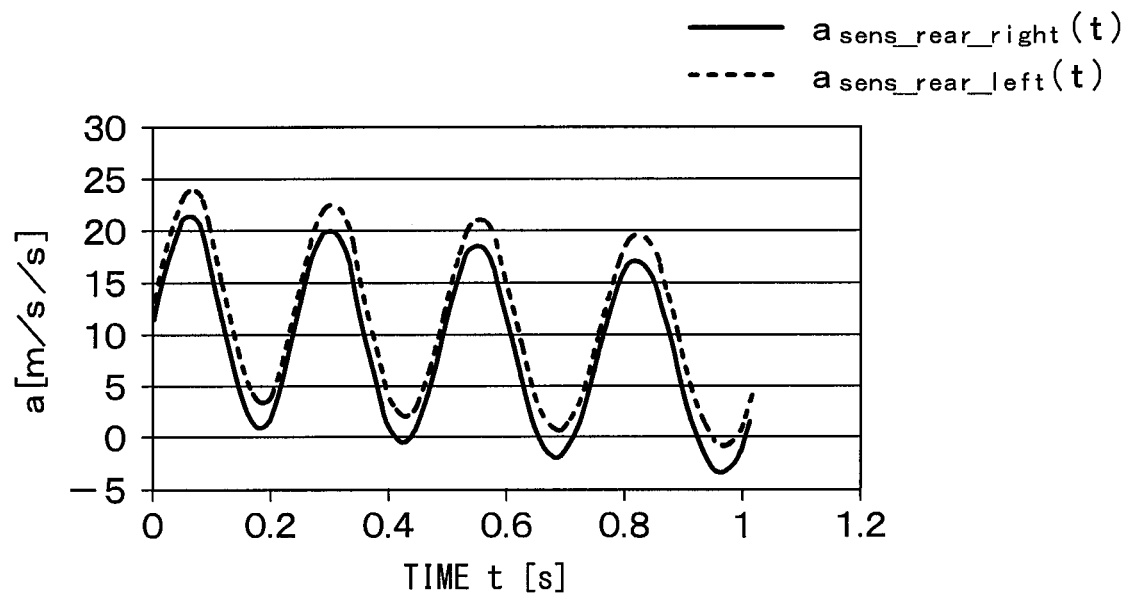
FIG. 8B is a graph of waveforms obtained when the acceleration a is measured based on detection signals from the G sensors in the sensor transmitters attached to the rear right and left wheels.

It is assumed that measurement of the acceleration a based on detection signals from the G sensors 22 of the sensor transmitters 2 respectively attached to the front right wheel 5a and the front left wheel 5b has produced results plotted in FIG. 8A. It is also assumed that measurement of the acceleration a based on detection signals from the G sensors 22 of the sensor transmitters 2 respectively attached to the rear right wheel 5c and the rear left wheel 5d has produced results plotted in FIG. 8B. It is further assumed that measurement of differentiated values da/dt of the acceleration a based on the detection signals from the G sensors 22 of the sensor transmitters 2 respectively attached to the front right wheel 5a and the front left wheel 5b has produced results plotted in FIG. 9A. It is also assumed that measurement of differentiated values da/dt of the acceleration a based on the detection signals from the G sensors 22 of the sensor transmitters 2 respectively attached to the rear right wheel 5c and the rear left wheel 5d has produced results plotted in FIG. 9B.

Figure 9A:
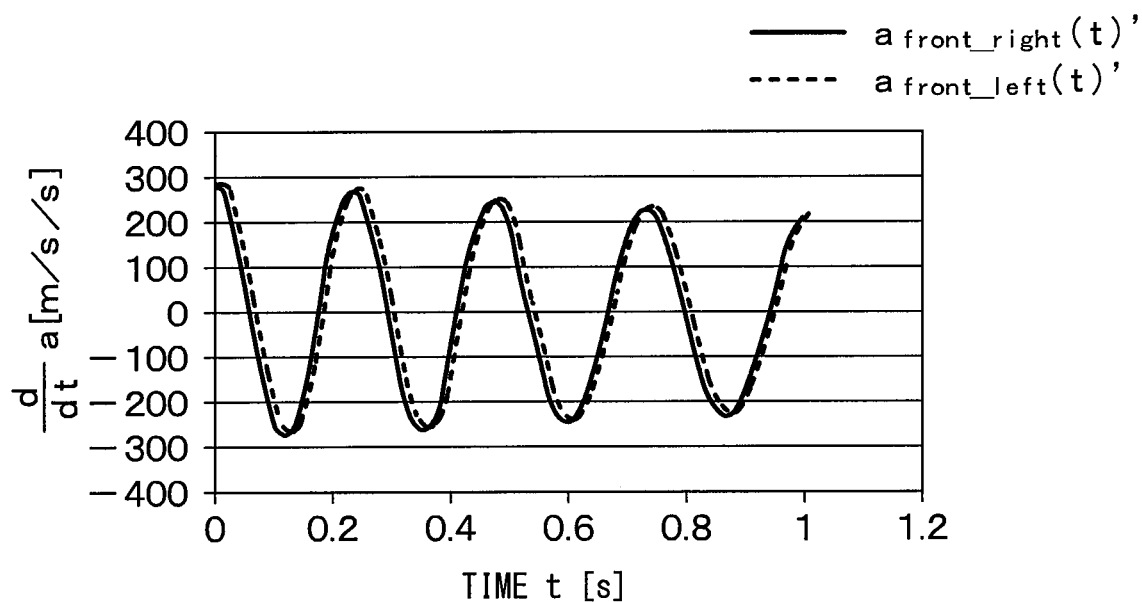
FIG. 9A is a graph of waveforms obtained when differentiated values da/dt of the acceleration a are measured based on detection signals from the G sensors in the sensor transmitters attached to the front right and left wheels.
Figure 9B:
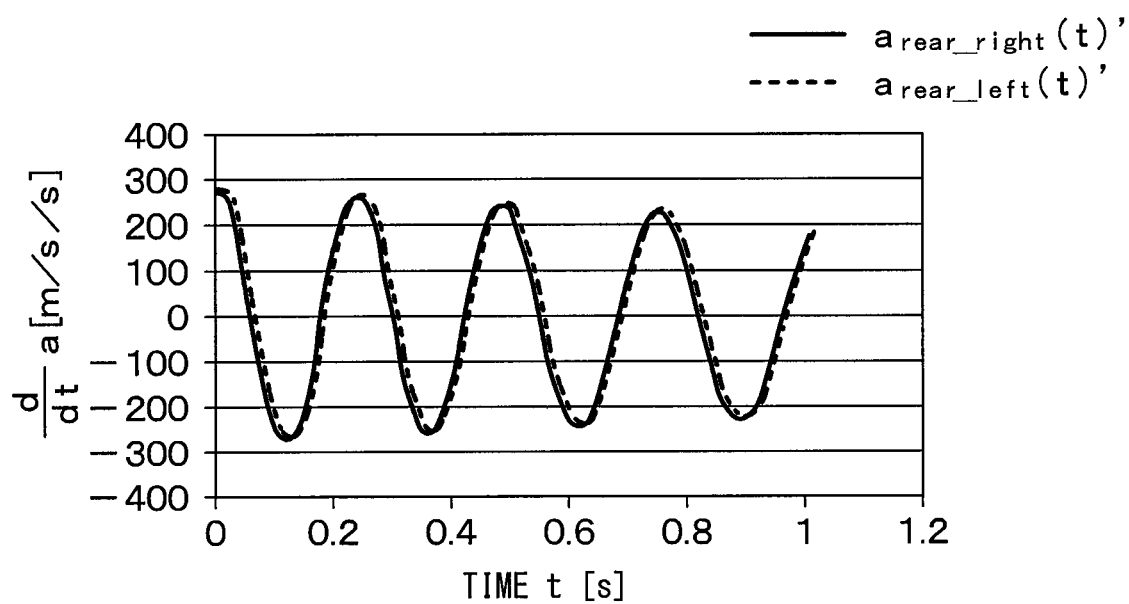
FIG. 9B is a graph of waveforms obtained when the differentiated values da/dt of the acceleration a are measured based on detection signals from the G sensors in the sensor transmitters attached to the rear right and left wheels.
Figure 10A:
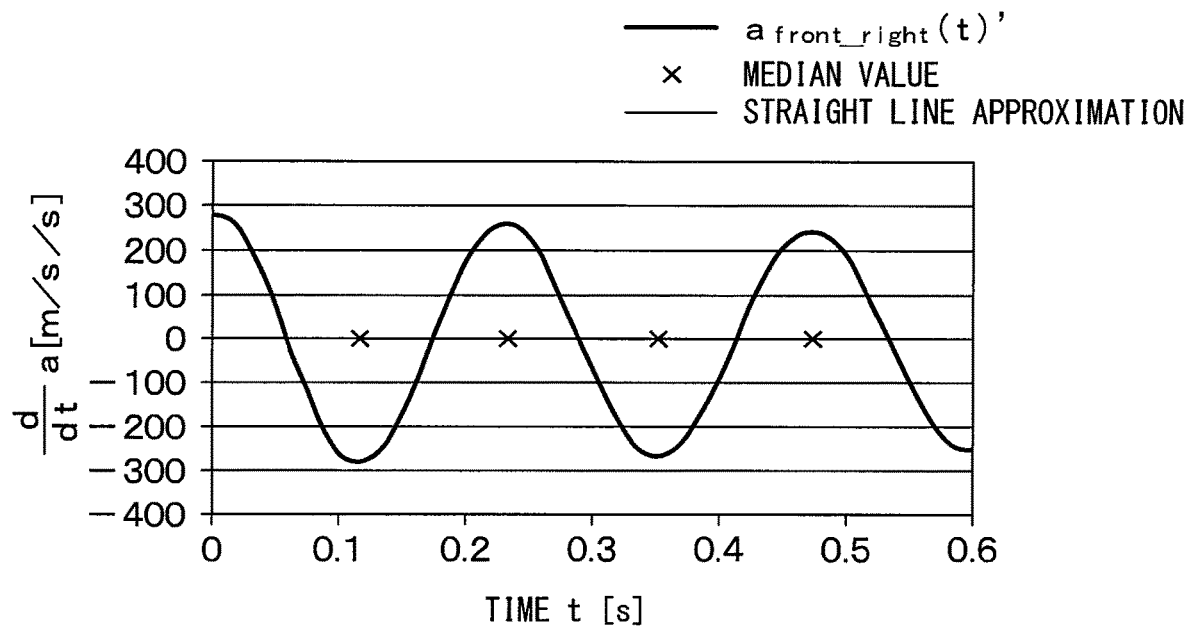
FIG. 10A is a graph for describing the waveform of the differentiated value da/dt of the acceleration a of the front right wheel and how its median values are approximated to a straight line.
Figure 11A:
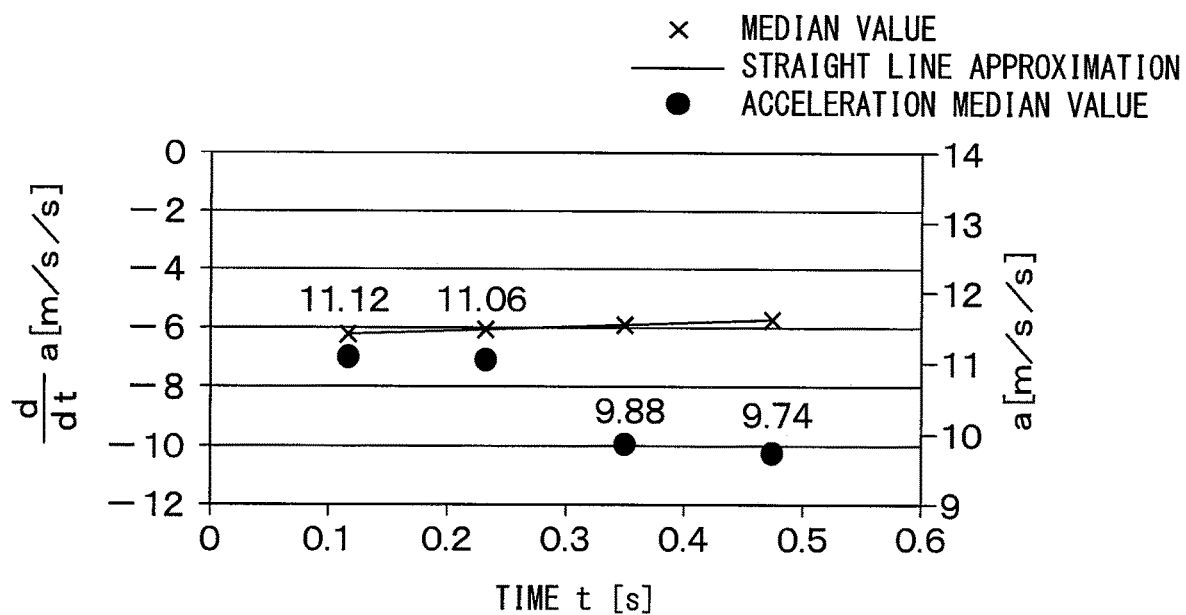

The differentiated value da/dt of the acceleration a of the front right wheel 5a is extracted from FIG. 9A and median values of the differentiated value da/dt of the acceleration a are obtained based on relative maximum values and relative minimum values. The results when connected are as shown in FIG. 10A. A straight line connecting the median values indicates a straight line representing the measurement linear function. The straight line representing the measurement linear function and the median values of the acceleration a are plotted in FIG. 11A.

Using two points on the straight line representing the measurement linear function and substituting the median values of the differentiated value da/dt of the acceleration a at the two points and the time t at which the median values are achieved in the Expression 23 produces simultaneous equations of $C1_{front\_right}$ and $C2_{front\_right}$. By solving the simultaneous equations, $C1_{front\_right}$ and $C2_{front\_right}$ are calculated. Since the measurement quadratic function is expressed by the Expression 22 described above, a median value is obtained from the acceleration a in FIG. 8A at one point, and the median value and the time t at which the median value is achieved as well as $C1_{front\_right}$ and $C2_{front\_right}$, which have been obtained, are substituted in the Expression 22. In this manner, $C3_{front\_right}$ is calculated.

In this example, the results show that $C1_{front\_right}$ is equal to 0.6912, $C2_{front\_right}$ is equal to −6.313, and $C3_{front\_right}$ is equal to 12.23.

Calculation of $B_{front\_right}$ using the Expression 33-1 results in −4.567, and $\tan(\theta_{set\_front\_right})$ is 11.43 when $\theta_{set-front-right}$ is 85°. The Expression 28-1 using $D_{front\_right}$ thus yields 3.163. Also, $D_{front\_right}/\tan(\theta_{set\_front\_right})$ is equal to −0.2768.

It is assumed that, when the sensor transmitter 2 placed on the front right wheel 5a performs the calculation based on a detection signal from the corresponding G sensor 22, values as indicated above are calculated. It can be thus estimated that the acceleration a<0 based on B calculated. Since tan $\theta_{set}$ is positive, the direction proportional component D<0, and the sign of the acceleration a is the same as that of the direction proportional component D, it can be determined that the sensor transmitter 2 is attached to one of the right wheels 5a and 5c.

Figure 10B:
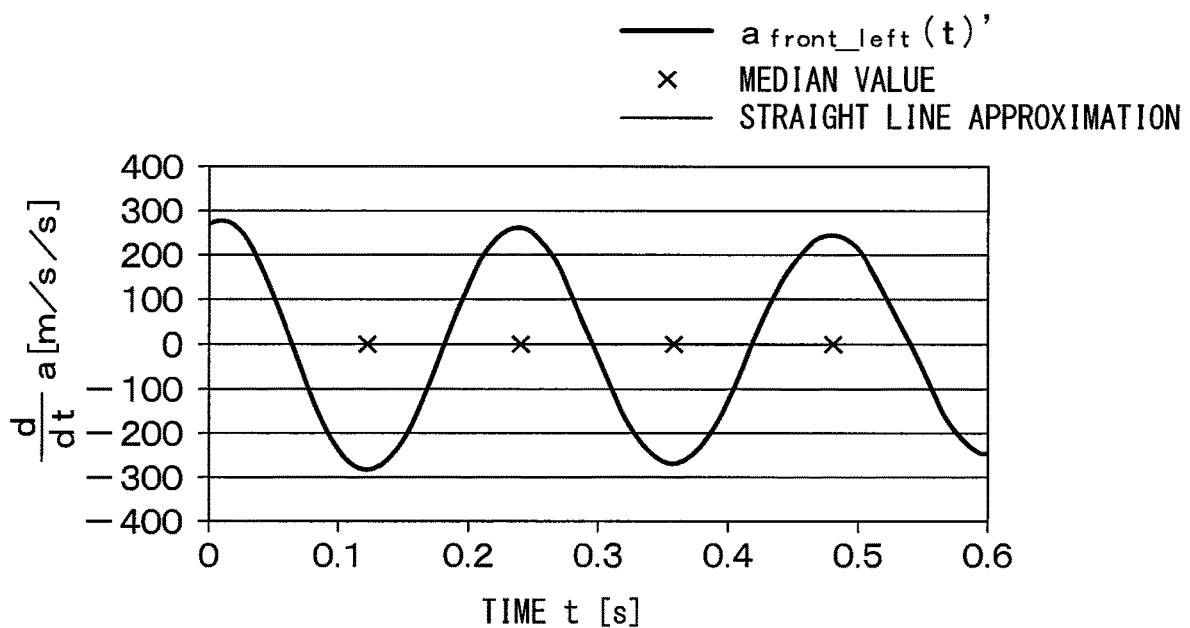
FIG. 10B is a graph for describing the waveform of the differentiated value da/dt of the acceleration a of the front left wheel and how its median values are approximated to a straight line.
Figure 10C:
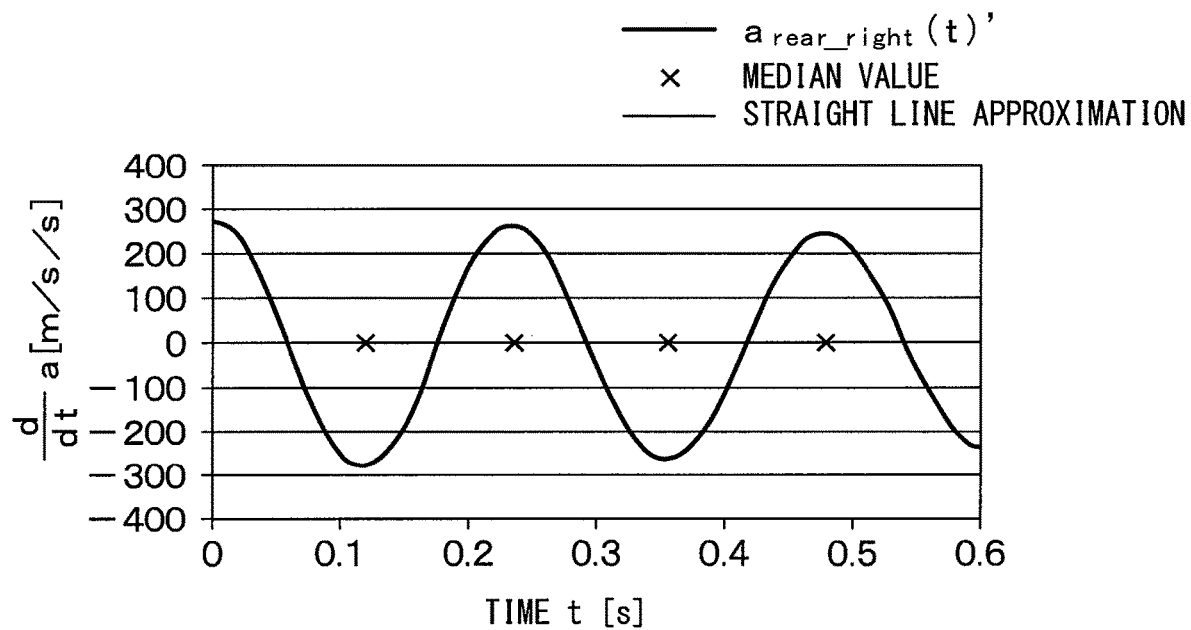
FIG. 10C is a graph for describing the waveform of the differentiated value da/dt of the acceleration a of the rear right wheel and how its median values are approximated to a straight line.
Figure 10D:
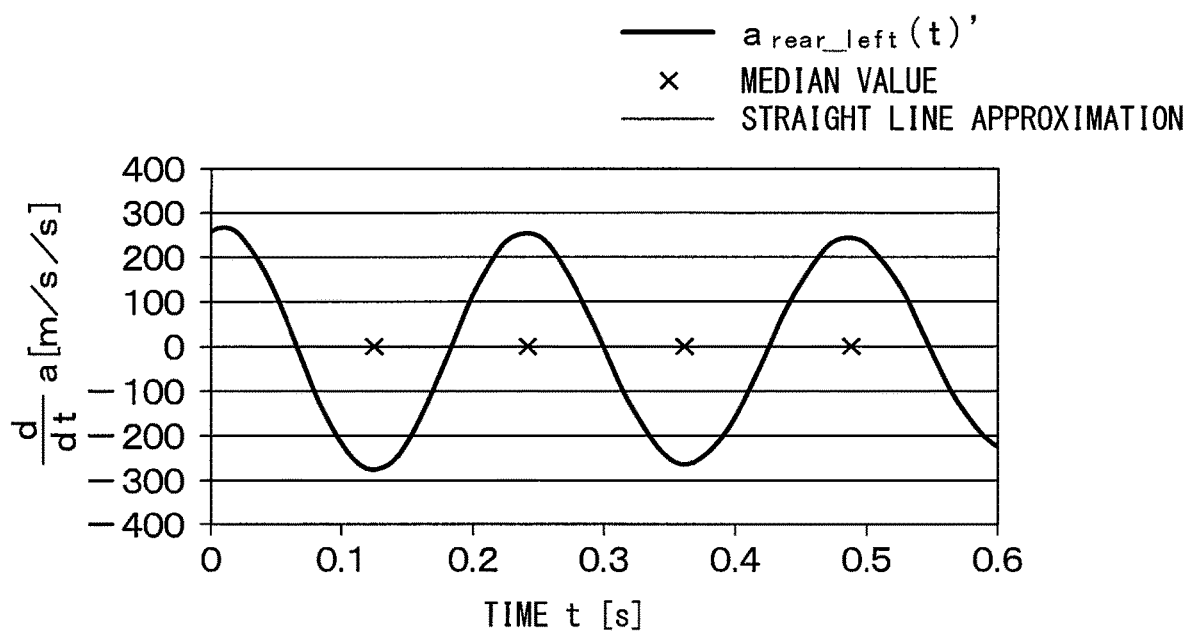
FIG. 10D is a graph for describing the waveform of the differentiated value da/dt of the acceleration a of the rear left wheel and how its median values are approximated to a straight line.
Figure 11B:
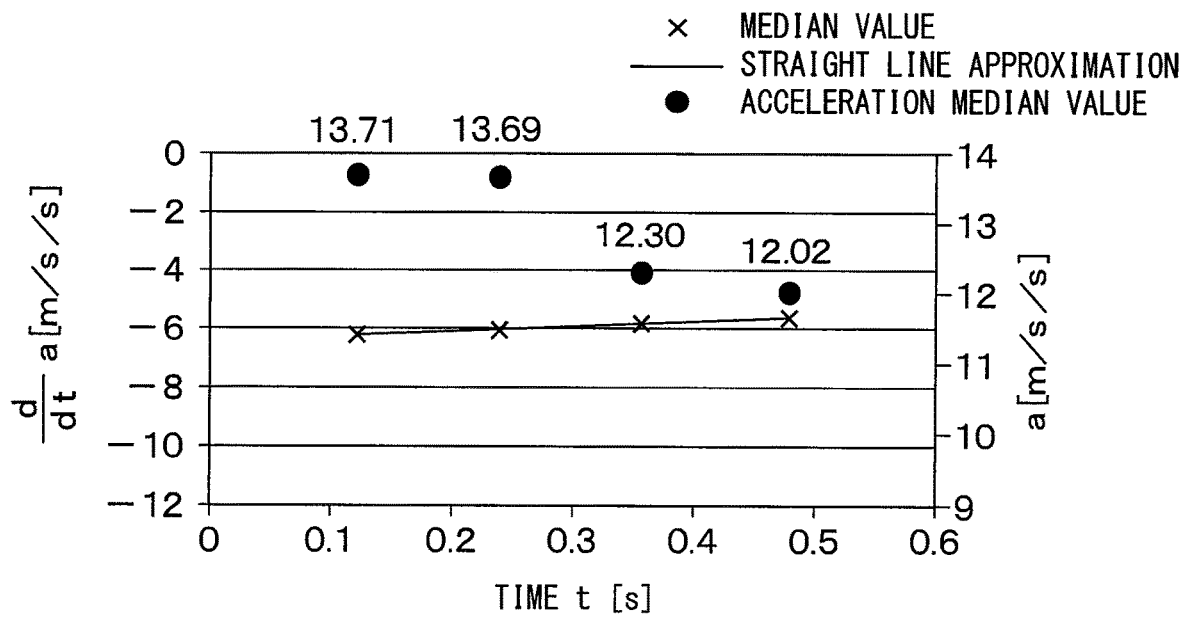
Figure 11C:
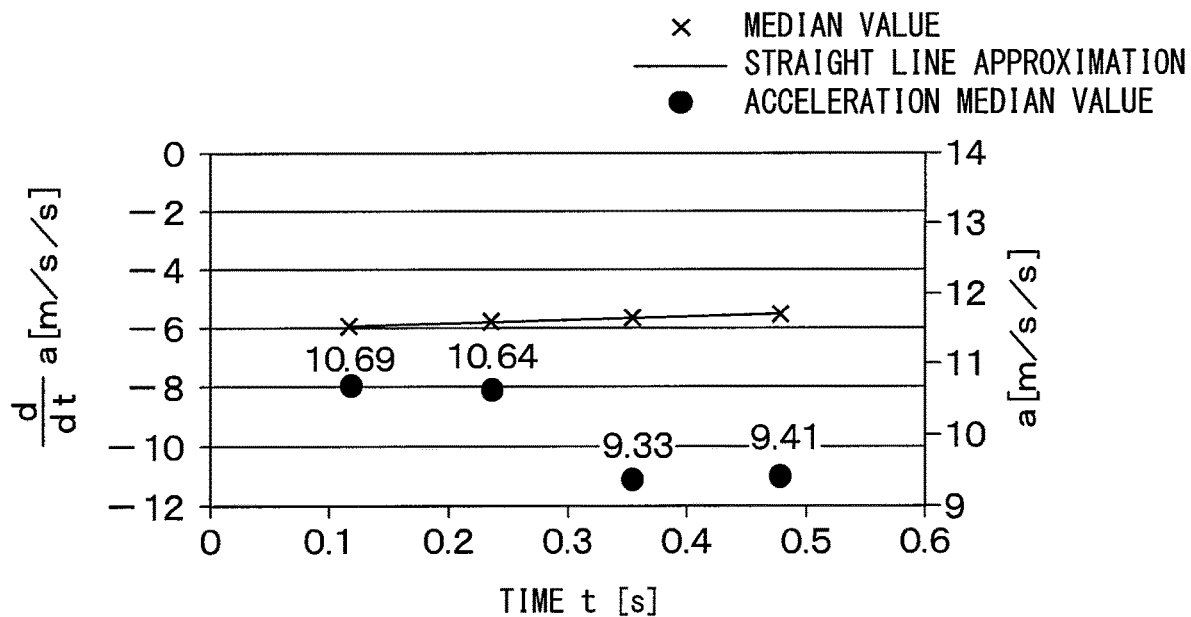
Figure 11D:
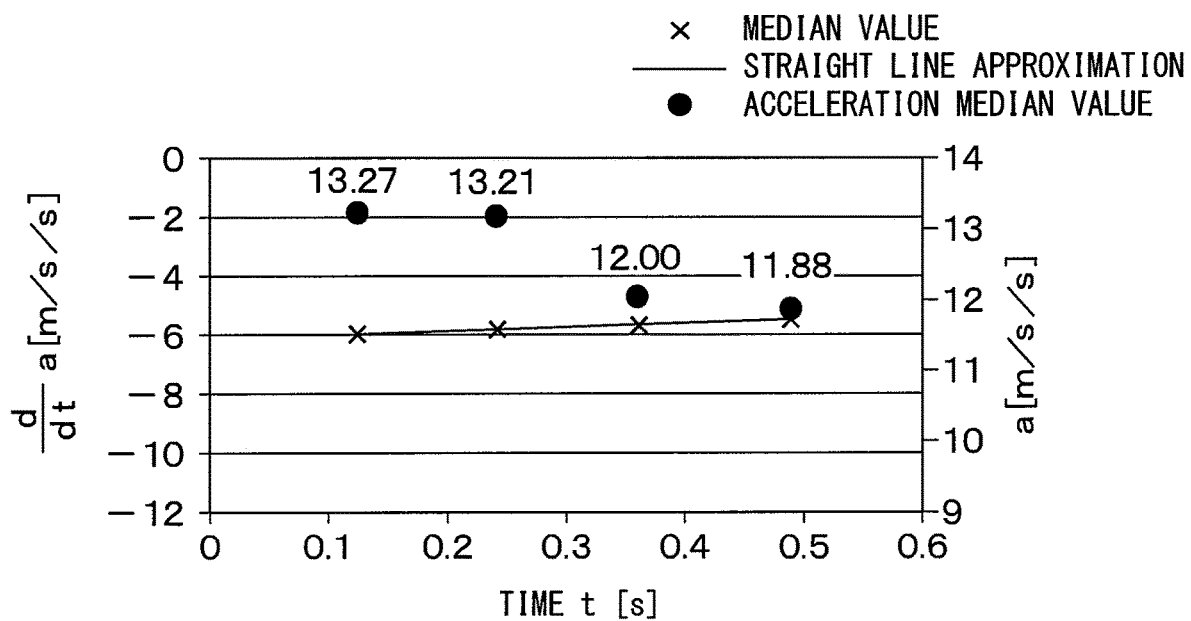

Similarly for each of the front left wheel 5b, the rear right wheel 5c, and the rear left wheel 5d, the differentiated value da/dt of the acceleration a is extracted, median values of the differentiated value da/dt of the acceleration a are obtained, and the results are connected as shown in FIG. 10B to FIG. 10D. Each straight line connecting the corresponding median values indicates a straight line representing the measurement linear function. The straight line representing the measurement linear function and the median values of the acceleration a are plotted in FIGS. 11B to 11D.

Calculating the front left wheel 5b, the rear right wheel 5c, and the rear left wheel 5d based on the results similarly to the front right wheel 5a yields the values described below.

For the front left wheel 5b, $C1_{front\_left}$ equal to 0.8120, $C2_{front\_left}$ equal to −6.393, $C3_{front\_left}$ is equal to 14.76, and $B_{front\_left}$ is equal to −4.567. Additionally, $D_{front\_left}$ is equal to 2.680, and $D_{front\_left}/\tan(\theta_{set\_front\_left})$ is equal to 0.2345. It can be thus estimated that the acceleration a<0 based on B calculated. Since tan $\theta_{set}$ is positive, the direction proportional component D>0, and the sign of the acceleration a is different from that of the direction proportional component D, it can be determined that the sensor transmitter 2 is attached to one of the left wheels 5b and 5d.

For the rear right wheel 5c, $C1_{rear\_right}$ equal to 0.6535, $C2_{rear\_right}$ is equal to −6.085, $C3_{rear\_right}$ is equal to 11.76, $B_{rear\_right}$ is equal to −4.656, $D_{rear\_right}$ is equal to −3.683 and $D_{rear\_right}/\tan(\theta_{set\_rear\_right})$ is equal to −0.3223. It can be thus estimated that the acceleration a<0 based on B calculated. Since tan $\theta_{set}$ is positive, the direction proportional component D<0, and the sign of the acceleration a is the same as that of the direction proportional component D, it can be determined that the sensor transmitter 2 is attached to one of the right wheels 5a and 5c.

For the rear left wheel 5d, $C1_{rear\_left}$ equal to 0.6704, $C2_{rear\_left}$ is equal to −6.139, $C3_{rear\_left}$ is equal to 14.38, $B_{rear\_left}$ is equal to −4.578, and $D_{rear\_left}$ is equal to 0.491. Also, $D_{rear\_left}/\tan(\theta_{set\_rear\_left})$ is equal to 0.04310. It can be thus estimated that the acceleration a<0 based on B calculated. Since tan $\theta_{set}$ is positive, the direction proportional component D>0, and the sign of the acceleration a is different from that of the direction proportional component D, it can be determined that the sensor transmitter 2 is attached to one of the left wheels 5b and 5d.

When the estimation of whether the sensor transmitter 2 is attached to one of the right wheels or one of the left wheels has been performed in the manner described above, a frame including data such as the result of the estimation and a value obtained during the estimation is transmitted by the sensor transmitter 2 and received by the receiver 3. The receiver 3 determines whether the sensor transmitter 2 that has transmitted the frame is attached to one of the right wheels or one of the left wheels based on the result of the estimation stored in the frame. The receiver 3 further determines whether the sensor transmitter 2 is attached to the front wheel or the rear wheel based on the value obtained during the estimation and stored in the frame. In this manner, it can be determined which one of the wheels 5a to 5d the sensor transmitter 2 is attached to.

Other Embodiments

While the present disclosure has been described in accordance with the embodiment described above, the present disclosure is not limited to the embodiment and includes various modifications and equivalent modifications. Additionally, various combinations and configurations, as well as other combinations and configurations including more, less, or only a single element, are within the scope and spirit of the present disclosure.

While the configuration of the receiving antenna 31 in the embodiment described above comprises one shared antenna, a plurality of antennas may be provided. For example, four antennas may be provided, corresponding to the wheels 5a to 5d. The present disclosure, however, is effective when a shared antenna is used because it is difficult to identify which one of the wheels 5a to 5d the sensor transmitter 2 is attached to particularly when the receiving antenna 31 is a shared antenna.

In the embodiment described above, data indicative of a result of the wheel positional detection is stored in a frame that stores information on tire air pressure, because the wheel positional detection apparatus is used in the tire pressure monitoring system. This, however, merely presents an example frame configuration; a frame for storing the data indicative of the result of the wheel positional detection and another frame for storing the information on the tire air pressure may be provided separately. Note that, by storing data indicative of a result of the wheel positional detection in a frame that stores information on tire air pressure, the frame can be used as a shared frame that can be used for both the wheel positional detection and the tire air pressure detection.

In the embodiment described above, a case has been described as an example where the value of a/rw related to the effective tire radius is used as an example method of determining whether the sensor transmitter 2 is attached to one of the front wheels 5a and 5b or one of the rear wheels 5c and 5d. However, other methods than that described in the foregoing embodiment may be used. For example, results of acceleration detection performed by the G sensors 22 may be stored in frames and phases of waveforms of the acceleration from the G sensors 22 in the sensor transmitters 2 attached to the right wheels 5a and 5c may be compared to each other, or phases of waveforms of the acceleration from the G sensors 22 in the sensor transmitters 2 attached to the left wheels 5b and 5d may be compared to each other, to determine whether the sensor transmitter 2 is attached to the front wheel or the rear wheel. Additionally, while a/rw is stored in a frame as a value related to the effective tire radius, the effective tire radius itself may be stored in the frame as a value related to the effective tire radius.

In the embodiment described above, the sign of the acceleration a is determined to be positive or negative based on a fact that the vehicle 1 is traveling forward in most cases at the timing when the wheel positional detection is performed. Alternatively, other methods can be used to determine the sign of the acceleration a to be positive or negative. For example, if the period of an amplitude waveform of a detection signal from the G sensor 22 exhibits a tendency to decrease, it can be determined that the vehicle is accelerating, where the tire rotation period shortens. Conversely, if the period exhibits a tendency to increase, it can be determined that the vehicle is decelerating, where the tire rotation period lengthens. The sign of the acceleration a can be thus determined to be positive or negative by obtaining the period of an amplitude waveform from the time interval between relative maximum values or between relative minimum values and determining whether the period exhibits a tendency to decrease or increase.

The invention claimed is:

1. A wheel positional detection apparatus for a vehicle in which four wheels are attached to a vehicle body, the four wheels each being equipped with a tire, the wheel positional detection apparatus comprising:
 a sensor transmitter attached to each of the four wheels, the sensor transmitter including
  an acceleration sensor configured to detect acceleration in a detection direction that is shifted circumferentially by an arbitrary angle with respect to a radial direction of each of the four wheels, and
  a first controller configured to perform wheel positional detection based on the acceleration detected by the acceleration sensor, and to generate and transmit a frame that stores data indicative of a result of the wheel positional detection; and
 a receiver provided on the vehicle body, the receiver including
  a receiving unit configured to receive the frame transmitted from each of the sensor transmitters through a receiving antenna, and
  a second controller configured to determine whether the sensor transmitter that has transmitted the frame is attached to a right wheel or a left wheel of the four wheels based on the data indicative of result of the wheel positional detection obtained from the received frame,
 wherein the first controller calculates a tilt angle that corresponds to the arbitrary angle detected by the acceleration sensor and shifted circumferentially with respect to the radial direction based on the acceleration detected by the acceleration sensor,
 wherein the first controller estimates whether the sensor transmitter including the first controller is attached to the right wheel or the left wheel based on a calculation quadratic function, a calculation linear function, a measurement quadratic function and a measurement linear function,
 wherein the calculation quadratic function approximates a median value of an amplitude of a calculation value of acceleration by a quadratic function, in response to that the acceleration sensor is attached to the corresponding one of the wheels to form the tilt angle,
 wherein the calculation linear function approximates a median value of a differentiated value of the calculation value of the acceleration by a linear function
 wherein the measurement quadratic function approximates a median value of an amplitude of a value actually detected by the acceleration sensor by a quadratic function,
 wherein the measurement linear function approximates a median value of a differentiated value of the value actually detected by the acceleration sensor by a linear function,
 wherein the first controller calculates a term C1 and a term C2 based on a median value and time at which the median value is achieved at two points in the measurement linear function, and the first controller calculates a term C3 based on the calculated term C1, the calculated term C2, a median value, and time at which the median value is achieved at one point in the measurement quadratic function,
 wherein the term C1 represents a coefficient of a quadratic term of the measurement quadratic function, the term C2 represents a linear term of the measurement quadratic function, and the term C3 represents a constant term of the measurement quadratic function,
 wherein the first controller determines whether a sign of a term a is positive or negative when a sign of a term $v_0$ is positive based on $B=C2/2C1=v_0/a$ as a relational expression of a term B, the calculated term C1, and the calculated term C2,
 wherein the first controller calculates a term D based on $D=-(C2/2C1)^2+C3/C1$ as a relational expression of the term D, the calculated term C1, the calculated term C2, and the calculated term C3, and
 wherein the first controller estimates whether the sensor transmitter including the first controller is attached to the right wheel or the left wheel based on whether a sign of a term $\tan \theta_{set}$ calculated from a term $\theta_{set}$ and signs of the term a and the term D are identical with each other,
 wherein the term a represents acceleration of the vehicle body, the term $v_0$ represents an initial velocity of a vehicle velocity, the term $\theta_{set}$ represents the tilt angle, the term B represents an acceleration/deceleration indication value that indicates whether the vehicle is accelerating or decelerating, and the term D represents a direction proportional component resulting from removal of a gravitational acceleration component and a centrifugal acceleration component from a detection result of the acceleration sensor.

2. The wheel positional detection apparatus according to claim 1,
 wherein the first controller estimates that the sensor transmitter is attached to the right wheel in response to that the sign of the term $\tan \theta_{set}$ is positive and the signs of the term a and the term D are identical with each other,
 wherein the first controller estimates that the sensor transmitter is attached to the left wheel in response to that the sign of the term $\tan \theta_{set}$ is positive and the signs of the term a and the term D are different from each other, and
 wherein the first controller estimates that the sensor transmitter is attached to the right wheel in response to that the sign of the term $\tan \theta_{set}$ is negative and the signs of the term a and the term D are different from each other, and
 wherein the first controller estimates that the sensor transmitter is attached to the left wheel in response to that the sign of the term $\tan \theta_{set}$ is negative and the signs of the term a and the term D are identical with each other.

3. The wheel positional detection apparatus according to claim 1,
 wherein the first controller calculates the tilt angle, in response to that the first controller detects that the vehicle speed is constant based on acceleration detected by the acceleration sensor.

4. The wheel positional detection apparatus according to claim 1,
   wherein the right wheel includes a right front wheel and a right rear wheel,
   wherein the left wheel includes a left front wheel and a left rear wheel,
   wherein the first controller calculates a value of an expression of a/rw related to an effective tire radius from a coefficient of a quadratic term of the calculation quadratic function and the coefficient of the quadratic term of the measurement quadratic function,
   wherein the first controller stores data of the value related to the effective tire radius in the frame, and transmits the frame,
   wherein the second controller compares, based on the data of the value related to the effective tire radius stored in the frame, lengths of the effective tire radii from those of the sensor transmitters that have been determined to be attached to the right wheel, and
   wherein the second controller determines that one of the sensor transmitters that has transmitted data of a smaller effective tire radius is attached to the front right wheel and determines that one of the sensor transmitters that has transmitted data of a larger effective tire radius is attached to the rear right wheel,
   wherein the second controller further compares, based on the data of the value related to the effective tire radius stored in the frame, lengths of the effective tire radii from those of the sensor transmitters that have been determined to be attached to the left wheel, and
   wherein the second controller determines that one of the sensor transmitters that has transmitted data of a smaller effective tire radius is attached to the front left wheel and determines that one of the sensor transmitters that has transmitted data of a larger effective tire radius is attached to the rear left wheel.

5. The wheel positional detection apparatus according to claim 1,
   wherein the four wheels includes a front wheel and a rear wheel,
   wherein the first controller stores a value related to the effective tire radius during acceleration and during deceleration based on the acceleration detected by the acceleration sensor,
   wherein the first controller compares an absolute value of the value related to the effective tire radius stored during the acceleration to an absolute value of the value related to the effective tire radius stored during the deceleration,
   wherein the first controller determines that the sensor transmitter including the first controller is attached to the front wheel in response to that the absolute value of the value stored during the acceleration is smaller than the absolute value of the value stored during the deceleration, and
   wherein the first controller determines that the sensor transmitter including the first controller is attached to the rear wheel in response to that the absolute value of the value stored during the acceleration is larger than the absolute value of the value stored during the deceleration.

6. A sensor transmitter included in the wheel positional detection apparatus according to claim 1.

7. A tire pressure monitoring system, comprising:
   the wheel positional detection apparatus according to claim 1,
   wherein the sensor transmitter comprises a sensor configured to output a detection signal corresponding to an air pressure of the tire attached to the corresponding one of the respective four wheels,
   wherein the sensor transmitter stores, in a frame, information on tire air pressure resulting from signal processing performed by the first controller on the detection signal from the sensor and transmits the frame to the receiver, and
   wherein the second controller in the receiver determines an air pressure of the tire attached to each of the four wheels from the information on the tire air pressure.

* * * * *